United States Patent
Hogan et al.

(10) Patent No.: US 12,421,031 B1
(45) Date of Patent: Sep. 23, 2025

(54) ENERGY LIMITING DEVICE FOR TRANSFERRING CONTAINERS

(71) Applicant: Amazon Technologies, Inc., Seattle, WA (US)

(72) Inventors: Scott Hogan, Mukilteo, WA (US); Colburn Davis, Everett, WA (US)

(73) Assignee: Amazon Technologies, Inc., Seattle, WA (US)

( * ) Notice: Subject to any disclaimer, the term of this patent is extended or adjusted under 35 U.S.C. 154(b) by 371 days.

(21) Appl. No.: 18/077,898

(22) Filed: Dec. 8, 2022

(51) Int. Cl.
*B65G 1/04* (2006.01)
*B66F 9/02* (2006.01)

(52) U.S. Cl.
CPC ......... *B65G 1/0421* (2013.01); *B65G 1/0435* (2013.01); *B66F 9/02* (2013.01); *B65G 2201/0235* (2013.01); *B65G 2203/0283* (2013.01); *B65G 2203/042* (2013.01)

(58) Field of Classification Search
None
See application file for complete search history.

(56) References Cited

U.S. PATENT DOCUMENTS

| | | | |
|---|---|---|---|
| 4,395,181 A * | 7/1983 | Loomer | B65G 1/0414 254/4 B |
| 6,280,135 B1* | 8/2001 | Cunningham | B23D 35/008 414/280 |
| 9,334,116 B2* | 5/2016 | DeWitt | B65G 1/04 |
| 10,399,774 B2* | 9/2019 | Ramankutty | B65G 1/0414 |
| 10,752,157 B1* | 8/2020 | Zeller | B65G 67/24 |
| 10,894,674 B2* | 1/2021 | Wagner | B65G 67/02 |
| 10,947,060 B2* | 3/2021 | Cohen | B65G 47/71 |
| 10,974,897 B2* | 4/2021 | Pankratov | B65G 1/1375 |
| 11,254,502 B2* | 2/2022 | Conrad | B65G 1/0492 |
| 11,373,134 B2* | 6/2022 | Kumar | G06Q 10/00 |
| 11,629,009 B2* | 4/2023 | Eil | B65G 1/1378 700/216 |
| 11,893,533 B2* | 2/2024 | Pankratov | G06Q 10/087 |

* cited by examiner

*Primary Examiner* — Kavel Singh
(74) *Attorney, Agent, or Firm* — Eversheds Sutherland (US) LLP

(57) ABSTRACT

An assembly includes a conveyance mechanism configured to move in a first direction and a second direction opposite the first direction, and an energy limiting device coupled to the conveyance mechanism. The energy limiting device is configured to move in the first direction with the conveyance mechanism, and move in the second direction as the conveyance mechanism moves in the first direction upon an amount of force greater than a threshold amount of force being imparted to the energy limiting device. A sensor is configured to generate sensor data associated with movement of the energy limiting device in the second direction as the conveyance mechanism moves in the first direction.

20 Claims, 23 Drawing Sheets

ENERGY LIMITING DEVICE FOR TRANSFERRING CONTAINERS

BACKGROUND

The development of e-commerce has brought about an increase in order fulfillment, shipment, and distribution. As part of this, logistic centers, sorting facilities, and other like environments may process items. In some instances, robotic arms (e.g., manipulators) positioned about the environment may be configured to move (e.g., sort, package, etc.) the items. However, in some instances, the robotic arms may unsuccessfully or inefficiently move the items. In such instances, throughput within the environment is decreased and/or safety issues arise.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features. The systems depicted in the accompanying figures are not to scale and components within the figures may be depicted not to scale with each other.

DETAILED DESCRIPTION

Figure 1:
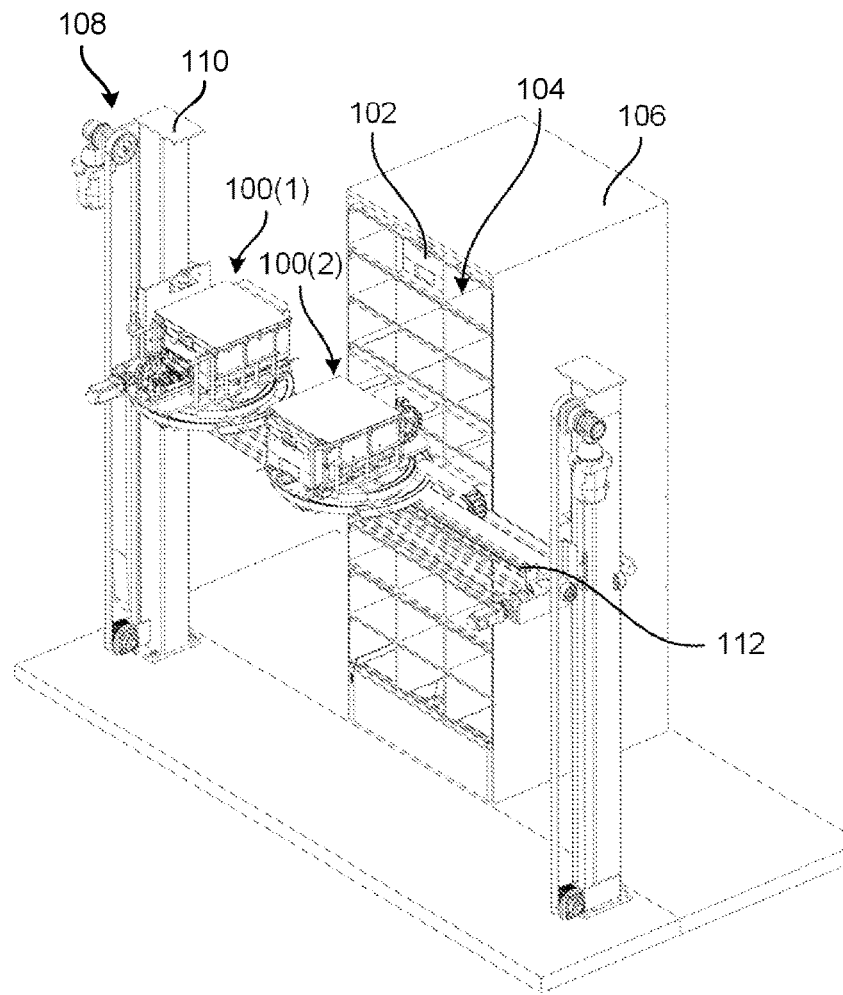
FIG. 1 illustrates a perspective view of an example positioning system with example head assemblies configured to transfer containers to a storage rack, according to examples of the present disclosure.
Figure 1:
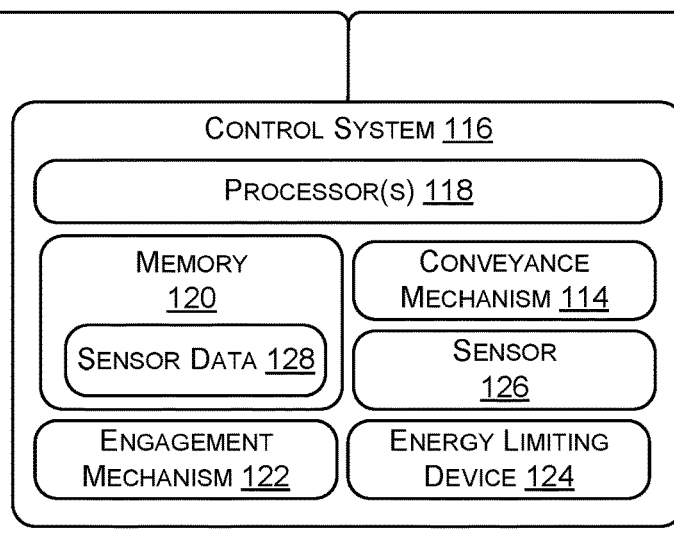
Figure 1:
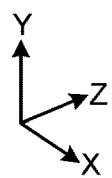

This application is directed, at least in part, to an energy limiting device used in conjunction with transferring containers (or items) in an environment. In some instances, a positioning system, such as an automatic storage and retrieval system (ASRS), within the environment may function to transfer containers (e.g., bins, totes, etc.) into/onto one or more storage racks. The containers themselves may include items to be packaged, sorted, or otherwise readied for shipment, processing, distribution, and so forth. Head assemblies, having a conveyance mechanism, may be coupled to the positioning system and effectuate to transfer the containers into the storage racks. In some instances, the head assembly may be components of the ASRS. The storage racks may include slots, and the positioning system may move the head assemblies into alignment for transferring the containers into the slots. The energy limiting device may be a component of, or operably coupled to, the conveyance mechanism and is configured to translate in the event that the container contacts the storage rack. For example, as the conveyance mechanism is loading a container into a slot, ends and/or sides of the container may contact the storage rack due a misalignment of the container on the slot. In these instances, the energy limiting device is configured to translate in a direction away from the container to avoid the container being pushed further into the storage rack via the conveyance mechanism. Consequently, this limits energy being imparted to the container. The energy limiting device, in some instances, may represent a passive device that translates upon experiencing a threshold amount of force. This may reduce damage to the container and/or the conveyance mechanism, avoid the storage rack tipping over, and/or limit repositioning the storage rack in the environment. The energy limiting device may therefore increase safety and/or throughput within the environment.

In some instances, the positioning system may include a robotic arm, Cartesian positioner, or other similar member that couples to the head assembly. The robotic arm may position the head assembly relative to the storage rack to transfer (e.g., load and/or unload) the containers into and/or from the storage rack. Among other components, the head assembly may include a base plate, the conveyance mechanism, which may be coupled to the base plate, an engagement mechanism operably coupled to the conveyance mechanism, and one or more one or more actuators. In some instances, one or more slides are disposed on the base plate and are configured to receive the containers.

In some instances, the conveyance mechanism may include a carriage that is configured to translate along rail(s) disposed on the base plate. For example, the carriage may translate along the rail during transferring of the containers to and from the storage rack, respectively. The engagement mechanism may include a suction mechanism, hooks, magnets (e.g., electromagnets), and so forth for engaging with the container. In instances in which the engagement mechanism includes a suction mechanism, the suction mechanism is configured to suction, via a suction cup, to a portion of the container (e.g., end), and the one or more actuators operate to translate conveyance mechanism. The engagement mechanism correspondingly moves with the conveyance mechanism. In some instances, the engagement mechanism couples to the carriage.

During a transferring of the containers into the slots, the one or more actuators (e.g., motors, rollers, etc.) may translate the carriage along the rail(s), and in doing so, push the container into the slot. During this instance, the engagement mechanism moves with the carriage and remains engaged with the container. Once within the slot, the engagement mechanism may disengage with the container in order to transfer the container from the head assembly and into the slot. For example, the suction cup may release from the container. Therein, the one or more actuators may actuate the carriage along the rail(s), in a direction away from the slot, thereby retracting the engagement mechanism from the container and back into the head assembly.

In some instances, the positioning system may be configured to move the container vertically, horizontally, and/or rotationally. Additionally, in some instances, the head assembly and/or the conveyance mechanism may operate asynchronously of the robotic arm. For example, the robotic arm may position the head assembly in front of a slot in which a container is to be transferred. Therein, the conveyance mechanism may be actuated in order to transfer the container into the slot. During this instance, the positioning system may remain stationary. The head assembly itself may be configured to move (e.g., rotate). In some instances, as the conveyance mechanism actuates and the engagement mechanism extends the container into the slot, other portions of the head assembly and/or the positioning system may remain stationary.

Additionally, or alternatively, instead of the robotic arm, the positioning system may represent a gantry, lift, or other suitable system. In some instances, the gantry, for example, may be configured to move the head assemblies vertically, horizontally, and/or rotationally. For example, the head assemblies may be coupled to or disposed on tracks, cables, rails, etc. Here, the gantry may move the head assemblies vertically, horizontally, and/or rotationally such that the head assemblies are positioned relative to the slots of the storage rack. To permit such movement, the gantry may include various motors, actuators, and so forth. Moreover, as similarly discussed above, the head assemblies and/or the conveyance mechanism may respectively be configured to move (e.g., rotationally, translationally, etc.) independently. In some instances, the gantry, or more generally, the positioning system, may include more than one head assembly, such that multiple head assemblies may operate to transfer the containers into/from the storage rack.

The storage rack, as introduced above, may include a plurality of slots into which the containers are configured to be placed. Generally, the storage rack may represent a station in which containers are transferred. In such instances, the station may be manually or robotically operated. In some instances, the storage rack may include any number of slots and the slots may be individually defined by a top, a bottom, and one or more sides. The slots are configured (e.g., sized) to receive the containers and/or a portion of the conveyance mechanism, such as the engagement mechanism, during transferring of the containers. For example, when the conveyance mechanism pushes the container into the slot, the engagement mechanism may be at least partially disposed within the slot.

In some instances, the storage racks are moveable about the environment (e.g., via robotic drives) or may be stationary within the environment. For example, robotic drives may be configured to maneuver the storage racks about the environment between different stations (e.g., picking, sorting, packaging, etc.). In some instances, the storage racks are configured to rest on top of, or be positioned on top of, the robotic drives. The environment may include any number of storage racks of different shapes and/or sizes. The positioning systems and head assemblies are positioned across the environment to transfer the containers into the storage racks. In some instances, the positioning system and/or the head assemblies may represent components of an ASRS, machine, or other system that transfers containers to, or between stations.

Generally, the energy limiting device is configured to translate upon the container contacting the storage rack. For example, while transferring the container into a slot of the storage rack, the container may contact the top, bottom, and/or sides of the slot due to a misalignment on the slot. In these events, the storage rack may be at risk of tipping over, potentially causing injury to personnel and/or damage within the environment. Additionally, the storage rack may be reoriented, thereby misaligning the storage rack on the robotic drive. This reorientation may lead to downstream inefficiencies, for example, such as when the robotic drive transfers the storage rack to one or more stations within the environment. Additionally, such repositioning may cause faults to the robotic drive. However, the energy limiting device is configured to translate (e.g., collapse, displace, etc.) in order to reduce such occurrences. Such movement, as indicated above, may be passive in that the energy limiting device translates upon experiencing a threshold amount of force.

In some instances, the energy limiting device operably couples to the engagement mechanism. As the engagement mechanism engages with the container, for example, to transfer the container to the storage rack, the conveyance mechanism may correspondingly move the engagement mechanism in a first direction towards the storage rack. As the engagement mechanism moves, via the conveyance mechanism, to push the container out of the head assembly, in the event that the container contacts the storage rack, the container may push against the engagement mechanism. Given the operable coupling of the engagement mechanism to the energy limiting device, in the event that the container contacts the storage rack, force is imparted to the energy limiting device. Upon experiencing a threshold amount of force, or upon a threshold amount of force being applied to the energy limiting device via the engagement between the engagement mechanism and the container, the energy limiting device is configured to translate in the second direction away from the storage rack. That is, upon experiencing this threshold amount of force, the energy limiting device ceases to transmit significant force to the container by allowing the engagement device to displace relative to the conveyance mechanism. During such instances, the engagement mechanism may disengage with the portion of the container. That is, the engagement mechanism may be pulled away from the container, via the translation of the energy limiting device, such that the engagement mechanism no longer pushes the container into the storage rack during movement of the conveyance mechanism. Additionally, during this instance, because the engagement mechanism is no longer transferring (e.g., pushing on) the container, the amount of energy imparted to the container is limited.

In some instances, the energy limiting device may include an air cylinder with a poppet valve. The poppet valve may include a stem that is operably coupled to the engagement mechanism. For example, a first end of the poppet valve may be disposed within a chamber of the air cylinder, and a second end of the poppet valve may be coupled to the engagement mechanism (e.g., the suction cup). The first end of the poppet valve (e.g., head) may be sealed against the chamber as the chamber is pressurized with air. One or more seals (e.g., O-ring) may be disposed between the first end of the poppet valve and the air cylinder to seal the chamber or to seal the poppet valve.

In instances where the container contacts the storage rack, force is imparted to the poppet valve. Upon a sufficient amount of force, the poppet valve moves, and the first end of the poppet valve is displaced within the chamber. As such, upon a threshold amount of force being applied, the poppet valve may function to exhaust the air within the chamber in order to permit translation of the poppet valve (e.g., the first end) into the chamber. During this instance, the engagement mechanism may be displaced away from the container in order to cease or limit an amount of energy imparted to the container and/or the storage rack (.e., via continued movement of the conveyance mechanism). For example, the first end of the poppet valve may be unseated within the chamber and the air within the chamber may be vented through one or more exhaust ports. With the reduced pressure within the chamber, the poppet valve is permitted to collapse within the chamber and correspondingly move the engagement mechanism away from the container. This ceases, or limits, force being imparted to the container. That is, during this instance, given the translation of the poppet valve within the chamber, the engagement mechanism no longer pushes on the container and correspondingly, avoids pushing the container into further contact with the storage rack.

Additionally, or alternatively, the energy limiting device may include magnetic elements. Here, an arm (e.g., bar, member, shaft, support, etc.) may couple to the engagement mechanism and may be configured to translate similar to the poppet valve of the air cylinder as noted above. The arm may include first magnetic elements that engage with second magnetic elements disposed on, for example, a bracket. The first magnetic elements and the second magnetic elements attract to one another. For example, as the conveyance mechanism advances the engagement mechanism, such that the container is pushed into the storage rack, the first magnetic elements and the second magnetic elements may be engaged. However, in instances where the container contacts the storage rack, or when a sufficient amount of force is imparted to the arm, the first magnetic elements may be translated away from the second magnetic elements. For example, contacting the storage rack may cause the arm to translate in a direction away from the storage rack. Such translation may separate the first magnetic elements and the second magnetic elements, thereby allowing the arm to translate in a direction away from the storage rack to avoid the container being pushed further into the storage rack. In other instances, however, the first magnetic elements and/or the second magnetic elements may be omitted, and instead, the magnetic elements may be disposed on only one of the bracket or the arm. For example, the second magnetic elements may be omitted and instead, the first magnetic elements on the arm may be attracted to a magnetic material (e.g., steel) of the bracket. Alternatively, the first magnetic elements may be omitted and a magnetic material (e.g., steel) of the arm may be attracted to magnetic elements on the bracket.

Additionally, or alternatively, the energy limiting deice may include a cam mechanism. In some instances, the cam mechanism may include a cam follower, a cam profile, and one or more sleds operably coupled to the engagement mechanism. In some instances, a first sled may couple to the engagement mechanism via an arm. The first sled may also include the cam profile. The cam follower may be mounted to a second sled, and the cam follower may be engaged with the cam profile. In doing so, the first sled and the second sled may be coupled together. The cam profile includes a pocket in which the cam follower is configured to reside. The cam follower and the pocket may be pushed together under a force from a biasing member, air cylinder, or the like. As the engagement mechanism pushes the container into the storage rack, the cam follower resides within the pocket. However, during contact between the container and the storage rack, the first sled may translate (e.g., via the arm, shaft, etc.) to displace the cam follower out of the pocket. The geometry of the pocket and the spring constant of the biasing member may be designed to displace under a specific amount of force being imparted. Once the cam follower is displaced from the pocket, the cam follower may translate along the cam profile, and correspondingly, translate the engagement mechanism away from the container to avoid the container being pushed further into the storage rack.

In some instances, the energy limiting device, whether the poppet valve, the magnetic elements, and/or the cam mechanism, are configured to translate the engagement mechanism upon experiencing a threshold amount of force. Additionally, the operation of the poppet valve, the magnetic elements, and the cam mechanism may be passive in that the poppet valve, the magnetic elements, and the cam mechanism may translation upon experiencing the threshold amount of force. In some instances, the amount of force at which the poppet valve vents the air, the magnetic elements disengage, or the cam follower disengages with the pocket may be based on a weight of the container (and the items within the container) and/or a speed of the container (e.g., the speed at which the container is translating towards the storage rack). However, the poppet valve, the magnetic elements, and the cam mechanism may avoid translating when the amount of force is less than the threshold amount of force, such as when the conveyance mechanism is pushing the container into the slot. In such instances, the poppet valve, the magnetic elements, and the cam mechanism may move with the conveyance mechanism and not translate in the direction away from the storage rack.

In some instances, a sensor (e.g., proximity sensor, camera, mechanical switch, inductive sensor, etc.) senses a translation (e.g., collapse, displacement, movement, etc.) of the energy limiting device. In some instances, the sensor may be a component of the head assembly or the conveyance mechanism. The sensor may be arranged to sense a translation of the energy limiting device relative to the conveyance mechanism. For example, as the energy limiting device translates, whether via the poppet valve of the air cylinder, the arm/shaft with the magnetic elements, and/or the cam mechanism, the sensor may sense such translation. In some instances, the translation may represent a relative displacement of the energy limiting device compared to the conveyance mechanism. In some instances, the sensor may sense the translation of the poppet valve, the arm with the magnetic element, and/or the arm with the cam mechanism. When the sensor senses the movement, the conveyance mechanism, such as the one or more actuators, may be stopped. That is, the one or more actuators may be stopped from moving the conveyance mechanism in a direction towards the storage rack. In some instances, the one or more actuators are configured to actuate in a direction away from the storage rack after translation of the energy limiting device.

The one or more actuators of the conveyance mechanism may have a certain response time in order to stop movement and/or to move in a direction away from the storage rack (or other stations). This response time may result from a deacceleration of the one or more actuators. For example, during the deacceleration, the one or more actuators may continue to advance the conveyance mechanism in a direction towards the storage rack. However, given that the energy limiting device has already translated away from the storage rack, and therefore may be tripped, activated, collapsed, while the conveyance mechanism may continue to move, the engagement mechanism may avoid pushing the container further into the storage rack as the conveyance mechanism deaccelerates. Stated alternatively, if the energy limiting device were absent, the conveyance mechanism may continue to advance the engagement mechanism with the container into the storage rack during the deacceleration of the carriage. In such instances, additional energy would be imparted into the storage rack via the container contacting the storage rack.

In some instances, a control system may control an operation of the conveyance mechanism (e.g., the one or more actuators) that actuates (e.g., extends and retracts) the engagement mechanism during loading and unloading of the containers. The control system may be configured to receive data (e.g., signals) from the sensor. For example, in response to sensing a translation of the energy limiting device, relative to the conveyance mechanism, the control system may operate to control the conveyance mechanism. For example, the control system may cause the one or more actuators to stop movement in the first direction towards the storage rack and/or to reverse in the second direction away from the storage rack. In some instances, the control system may also control the positioning system and/or the head assemblies to transfer the containers on the storage rack.

The energy limiting device may include a biasing member (e.g., spring) that serves to reset the energy limiting device. The biasing member may facilitate an automated reset by biasing the energy limiting device. For example, after the energy limiting device has translated, following a contact with the storage rack, the biasing member may reset the energy limiting device. The biasing member, for example, may seat the first end of the poppet valve against the chamber to seal the chamber, may push the magnetic elements into engagement, and/or may push the cam follower into the pocket, respectively. The biasing mechanism also moves the engagement mechanism in a direction towards the container, however, such movement occurs after or current with the control system has actuated the one or more actuators to move the carriage away from the storage rack. Thus, the engagement mechanism does not push the container into contact with the storage container. Thereafter, the control system may actuate the positioning system and/or the head assembly to align the container relative to the slot. After being aligned, the conveyance mechanism may once again attempt to transfer the container into the slot.

Accordingly, in light of the above, the energy limiting device may function to translate and move the engagement mechanism away from the container in order to avoid pushing the container into the storage rack. In such instances, the energy limiting device may permit the engagement mechanism to be quickly translated in a direction away from the storage rack (or other transfer location). The translation of the energy limiting device is sensed via the sensor, which in response, may be used to control the conveyance mechanism. However, given that the engagement mechanism has already disengaged with the container, the engagement mechanism may not further push the container into the storage mechanism during a response time of the conveyance mechanism. Accordingly, a safety within the environment and/or a throughput of processing items within the environment may be increased.

The present disclosure provides an overall understanding of the principles of the structure, function, device, and system disclosed herein. One or more examples of the present disclosure are illustrated in the accompanying drawings. Those of ordinary skill in the art will understand that the devices and/or the systems specifically described herein and illustrated in the accompanying drawings are non-limiting embodiments. The features illustrated or described in connection with one embodiment may be combined with the features of other embodiments. Such modifications and variations are intended to be included within the scope of the appended claims.

FIG. 1 illustrates an example head assemblies 100 (singularly, "the head assembly 100") configured to transfer containers 102 (singularly, "the container 102") into and/or from slots 104 (singularly, "the slot 104") of a storage rack 106, according to examples of the present disclosure. In some instances, the head assemblies 100 may couple to a positioning system 108 that is configured to maneuver the head assemblies 100. For example, the positioning system 108 may position the head assemblies 100 for transferring (e.g., loading and unloading) the containers 102 into and/or from the storage rack 106. In some instances, the head assemblies 100 and/or the positioning system 108 may represent or be components of an ASRS.

In some instances, the positioning system 108 includes one or more lifts 110 and/or one or more tracks 112 that position the head assemblies 100 relative to the storage rack 106. For example, the head assemblies 100 may be positioned to load the containers 102 into a respective slot 104 on the storage rack 106. The lifts 110 and/or the tracks 112 may be powered via one or more motors. In some instances, the lifts 110 may move the head assemblies 100 in a vertical direction (e.g., Y-direction), while the tracks 112 may move the head assemblies 100 in a horizontal direction (e.g., X-direction). Movement of the lifts 110 may correspondingly move the one or more tracks 112 in the vertical direction. In some instances, the head assemblies 100 are coupled to the one or more tracks 112 such that actuation of the one or more tracks 112 correspondingly moves the head assemblies 100 in the horizontal direction.

The head assemblies 100 are configured to move relative to the positioning system 108. In some instances, the head assemblies 100 are configured to rotate (e.g., about the Y-axis) and/or translate (e.g., along the Z-axis). In some instances, movement of the head assembly 100 is independent of a movement of the positioning system 108. For example, to transfer the containers 102 into the slots 104 of the storage rack 106, the head assemblies 100 may rotate, translate, or otherwise position in order to align the containers 102 on the slots 104, respectively. As will be explained herein, the head assemblies 100 include a conveyance mechanism 114 configured to translate in a direction towards the slots 104 after transferring the container 102 into the slot 104, and in a direction away from the slots 104 to unload the container 102 into the slot 104 or after the container is located into the slot 104. Additional details of loading containers, unloading containers, transferring containers, and so forth are described in, for example, U.S. patent application Ser. No. 16/751,084, entitled "Container Transport", filed Jan. 23, 2020, U.S. patent application Ser. No. 17/098,604, entitled "Container Transporters", filed Nov. 16, 2020, U.S. patent application Ser. No. 17/315,664, entitled "Container Transporters with Dual Container Slots", filed May 10, 2021, and U.S. patent application Ser. No. 17/845,173, entitled "Pendulum Queue", filed Jun. 21, 2022, the entirety of which are herein incorporated by reference in their entirety and for all purposes.

The storage rack 106 may include any number of slots 104 spaced across a height (e.g., Y-direction) and width (e.g., X-direction) of the storage rack 106. The slots 104 themselves may include a depth (e.g., in the Z-direction), and may be defined by a top, a bottom, and sides. The slots 104 are configured to receive the containers 102, respectively. For example, the slots 104 may be loaded with the containers 102, and/or alternatively, the containers 102 may be unloaded from the slots 104. The storage rack 106 may include one or more faces for receiving the containers 102. The faces can include shelves, walls, compartments, and/or rails for receiving the containers 102. For example, the faces can be positioned in the storage rack 106 to arrange the containers 102 into vertical columns and/or horizontal rows.

In some instances, the storage rack 106 is located in an environment in which items are prepared for shipment, distribution, and so forth. For example, the containers 102 may contain items to be readied from shipment. As part of this process, the containers 102 (with the items residing therein) may arrive to the positioning system 108, whether via conveyors, robotic elements, manually, and so forth. The head assemblies 100 may serve to transfer the containers 102 into the slots 104 of the storage rack 106. For example, as part of the ASRS, the head assemblies 100 may receive the containers 102 for transferring the containers 102 to the storage rack 106. In such instances, the containers 102 are loaded onto the head assemblies 100, and unloaded from the head assemblies 100 (or loaded into the slots 104). This process may be repeated until the storage rack 106 is full or until the containers 102 are transferred into the storage rack 106. Additionally, the process may be reversed, whereby the containers 102 are transferred from the storage rack 106 to other bins, conveyors, robots, etc.

In some instances, the storage rack 106 may be moveable within the environment. For example, robotic drives (not shown) may maneuver the storage rack 106 about the environment. In some instances, the storage racks 106 may be positioned on top of the robotic drives. The environment may include any number of storage racks 106, and/or robotic drives that are configured to move the storage racks 106.

In some instances, a control system 116 may at least partially control an operation of the head assemblies 100. Additionally, or alternatively, the control system 116 may control an operation of the positioning system 108. For example, the control system 116 may control the positioning system 108 and/or the head assemblies 100 in order to direct the head assemblies 100 to transfer the containers 102 into certain slots 104 on the storage rack 106.

The control system 116 is shown including processor(s) 118 and memory 120, where the processor(s) 118 may perform various functions and operations associated with controlling the head assemblies 100 to transfer the containers 102, and the memory 120 may store instructions executable by the processor(s) 118 to perform the operations described herein. In some instances, the positioning system 108 and/or the head assemblies 100 represent components of the control system 116, or may represent components separate from the control system 116. In such instances, the control system 116 may communicatively couple to the positioning system 108.

As will be explained herein, the conveyance mechanism 114 of the head assembly 100 may include or be operably coupled to an engagement mechanism 122 that is configured to engage and disengage with the container 102. In some instances, the engagement mechanism 122 may include a suction mechanism (e.g., suction cup), magnetic elements, hooks, and the like that are actuatable or otherwise configured to engage and disengage with the container 102. For example, in instances in which the engagement mechanism 122 includes suction mechanisms (e.g., vacuum, suction cup, etc.), the engagement mechanism 122 may suction to an end of the container 102. The conveyance mechanism 114 may then be actuated (e.g., via one or more motors) to translate the container 102 into the slot 104. During this instance, the conveyance mechanism 114 moves the engagement mechanism 122 such that the container 102 is pushed into the slot 104. Once residing within the slot 104, the engagement mechanism 122 may release from the container 102 thereby unloading the container 102 from the head assembly 100. The conveyance mechanism 114 may also be used to pull the containers 102 into/onto the head assemblies 100 and to push the containers 102 off the head assemblies 100.

From time to time, during a transferring of the containers 102 into the slots 104, the containers 102 may contact portions of the storage rack 106. For example, if the container 102 is not aligned on the slot 104, the container 102 may be pushed into contact with the storage rack 106. During these instances, an energy limiting device 124 of the head assembly 100 may function to translate the engagement mechanism 122 in an opposite direction such that the conveyance mechanism 114 avoids further pushing the container 102 into contact with the storage rack 106. The energy limiting device 124 may therefore be operably coupled to the engagement mechanism 122 and the conveyance mechanism 114. In such instances, the translation of the energy limiting device 124 may collapse the energy limiting device 124, or a portion thereof, in a direction away from the storage rack 106.

In some instances, the energy limiting device 124 is positioned between the conveyance mechanism 114 and the engagement mechanism 122. In operation, as the energy limiting device 124 translates away from the storage rack 106, the conveyance mechanism 114 may continue to operate. However, during this instances the engagement mechanism 122 may no longer engage with the container 102, thereby preventing the conveyance mechanism 114 pushing the container 102 into further contact with the storage rack 106. In other instances, the energy limiting device 124 may disengage such that the conveyance mechanism 114 no longer pushes on the engagement mechanism 122. Here, the engagement mechanism 122 may remain attached to the container 102.

In some instances, as the energy limiting device 124 translates the engagement mechanism 122, such translation may be sensed via a sensor 126. In some instances, the sensor 126 may include a proximity sensor (e.g., inductive, capacitance, etc.), a mechanical switch, a camera, and so forth. The sensor 126 may generate sensor data 128 that is received by the control system 116. The sensor data 128 is indicative of a translation (e.g., displacement, movement, etc.) of the energy limiting device 124. If the sensor data 128 indicates a translation of the energy limiting device 124 by a certain threshold, the control system 116 may stop actuation of the conveyance mechanism 114 towards the storage rack 106, and alternatively, may stop the conveyance mechanism 114 and/or may reserve motion of the conveyance mechanism 114 in a direction away from the storage rack 106.

The control of the conveyance mechanism 114 may occur subsequent to the energy limiting device 124 translating the engagement mechanism 122 in a direction away from the storage rack 106. That is, for the sensor 126 to sense the translation of the engagement mechanism 122, the energy limiting device 124 initially translates the engagement mechanism 122 away from the storage rack 106. Additionally, the energy limiting device 124 may react more quickly than the conveyance mechanism 114 thereby preventing the engagement mechanism 122 pushing against the container 102 and imparting additional energy to the container 102. More particularly, the conveyance mechanism 114, may have a certain response time and/or deacceleration in order to stop movement. However, by including the energy limiting device 124, the energy limiting device 124 may translate the engagement mechanism 122 away from the storage rack 106 avoid pushing the container 102 into further contact with the storage rack 106 (i.e., before the conveyance mechanism 114 has the ability to halt (or reverse) movement of the container 102).

Details of the energy limiting device 124 are discussed herein, however, in some instances, the energy limiting device 124 may represent an air cylinder with a poppet valve, an arm/shaft with magnetic elements, and/or an arm with a cam follower engaged with a cam profile. In each of these examples, the air cylinder, the arm with the magnetic elements, and/or the arm with the cam follower are configured to passively translate the engagement mechanism 122 away from the storage rack 106. That is, the air cylinder, the arm with the magnetic elements, and/or the arm with the cam follower may be operably coupled to the engagement mechanism 122 such that in the event of the container 102 contacting the storage rack 106 (and experiencing a threshold amount of force), the energy limiting device 124 may function to allow displacement of the engagement mechanism 122 relative to the conveyance mechanism 114.

By way of brief introduction, in examples, the energy limiting device 124 may include the air cylinder with the poppet valve coupled to the engagement mechanism 122. In instances where the container 102 contacts the storage rack 106, force is imparted to the poppet valve. Upon experiencing a threshold amount of force, the poppet valve may displace, causing the poppet valve to exhaust the air within the air cylinder in order to displace the poppet valve. During this instance, the engagement mechanism 122 may disengage with the container 102 and move in a direction away from the storage rack 106. In examples in which the energy limiting device 124 includes magnetic elements disposed on an arm, the arm may couple to the engagement mechanism 122. For example, the arm may include first magnetic elements that engage with second magnetic elements. When the container 102 contacts the storage rack 106, the arm may translate and cause the first magnetic elements and the second magnetic elements to disengage. For example, contacting the storage rack 106 may cause the arm to translate in a direction away from the storage rack 106 and such translation may separate the first magnetic elements and the second magnetic elements. In examples in which the energy limiting device 124 includes the cam mechanism, the cam mechanism may include a cam follower, a cam profile, and a sled operably coupled to the engagement mechanism 122. The sled may couple to the engagement mechanism 122 via an arm. The cam profile includes a pocket in which the cam follower is configured to reside, under the force of a biasing element, and during contact between the container 102 and the storage rack 106, the cam follower may be displaced from the pocket. Once the cam follower is displaced from the pocket, the cam follower may translate along the cam profile.

The energy limiting device 124 may translate upon experiencing a certain amount of force. Such translation, for example, may be passive in that the energy limiting device collapses (i.e., moves) upon experiencing the threshold amount of force. In some instances, this amount of force may be less than an amount of force required (or necessary to) to tip over the storage rack 106 and/or reposition the storage rack 106 on the robotic drive. For example, when the energy limiting device 124 translates under the threshold amount of force, additional energy is limited to being imparted to the container 102 and/or the storage rack 106. If this amount of force is less than the threshold amount of force, then the storage rack 106 may not be at risk of tipping over and/or reorienting. However, if the amount of force is greater than the threshold amount of force, then the storage rack 106 may be at risk of tipping over and/or reorienting. In these instances, the energy limiting device 124 may function to translate the engagement mechanism 122. Additionally, the energy limiting device 124 may not collapse during normal operation (e.g., when pushing the container 102 into the slot 104 and/or without experiencing additional force via contacting the storage rack 106).

Given the different examples of the energy limiting device 124, the energy limiting device 124 may be respectively configured to translate upon experiencing the threshold amount of force. For example, the pressure within the chamber of the air cylinder may be vented to permit the poppet valve to translate internally (i.e., within the chamber), the cam follower may be displaced from the pocket of the cam profile, and the magnetic elements may disengage upon experiencing the threshold amount of force. Alternatively, the energy limiting device 124 does not translate in instances where the threshold amount of force is not experienced. This allows, for example, the magnetic elements to attract within one another such that the container 102 may be transferred into the slot. That is, the conveyance mechanism 114 moves the energy limiting device 124 in order to transfer the container 102 into the slot 104, and the energy limiting device 124 restricts such translation (i.e., collapsing) when the threshold amount of force is not experienced.

Although the positioning system 108 is shown including certain components (e.g., the lifts 110), the environment may include other type of systems configured to move the head assemblies 100, and/or the head assemblies 100 may be coupled to or disposed on other systems. For example, in some instances, the head assemblies 100 are disposed on an end of a robotic arm that position the head assemblies 100 for transferring containers 102 into the storage rack 106. Additionally, although two head assemblies 100, such as a first head assembly 100(1) and a second head assembly 100(2) are shown disposed on the one or more tracks 112, more than or less than two head assemblies 100 may be disposed one the one or more tracks 112. In some instances, the head assemblies 100 are independently operable in order to transfer containers 102 into and/or from the slots 104, respectively.

The connection between the positioning system 108 and the head assembly 100 is strong enough to support the combined weight of the container 102 and items contained therein. In some instances, connection points are routed between the positioning system 108 and the head assembly 100 for coupling power, signal lines, hydraulic lines, pneumatic lines, and/or other suitable connections to permit proper functioning of the components described herein.

Additionally, despite the head assembly 100 and/or the conveyance mechanism 114 being discussed in regard to transferring the container 102 into/from the storage rack 106, the head assembly 100 and/or the conveyance mechanism 114 may be used in other applications and/or environments. For example, the head assembly 100 and/or the conveyance mechanism 114 may be used to transfer luggage, restock items within storage, and so forth. More generally, the head assemblies 100 may transfer the containers 102 to, or between stations, where the station may include an operator station or a robotic station.

As used herein, a processor, such as the processor(s) 118, may include multiple processors and/or a processor having multiple cores. Further, the processor(s) may comprise one or more cores of different types. For example, the processor(s) may include application processor units, graphic processing units, and so forth. In one implementation, the processor(s) may comprise a microcontroller and/or a microprocessor. The processor(s) may include a graphics processing unit (GPU), a microprocessor, a digital signal processor or other processing units or components known in the art. Alternatively, or in addition, the functionally described herein can be performed, at least in part, by one or more hardware logic components. For example, and without limitation, illustrative types of hardware logic components that may be used include field-programmable gate arrays (FPGAs), application-specific integrated circuits (ASICs), application-specific standard products (ASSPs), system-on-a-chip systems (SOCs), complex programmable logic devices (CPLDs), etc. Additionally, each of the processor(s) may possess its own local memory, which also may store program components, program data, and/or one or more operating systems.

Memory, such as the memory 120, may include volatile and nonvolatile memory, removable and non-removable media implemented in any method or technology for storage of information, such as computer-readable instructions, data structures, program component, or other data. Such memory may include, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, RAID storage systems, or any other medium which can be used to store the desired information and which can be accessed by a computing device. The memory may be implemented as computer-readable storage media ("CRSM"), which may be any available physical media accessible by the processor(s) to execute instructions stored on the memory. In one basic implementation, CRSM may include random access memory ("RAM") and Flash memory. In other implementations, CRSM may include, but is not limited to, read-only memory ("ROM"), electrically erasable programmable read-only memory ("EEPROM"), or any other tangible medium which can be used to store the desired information and which can be accessed by the processor(s).

Figure 2:
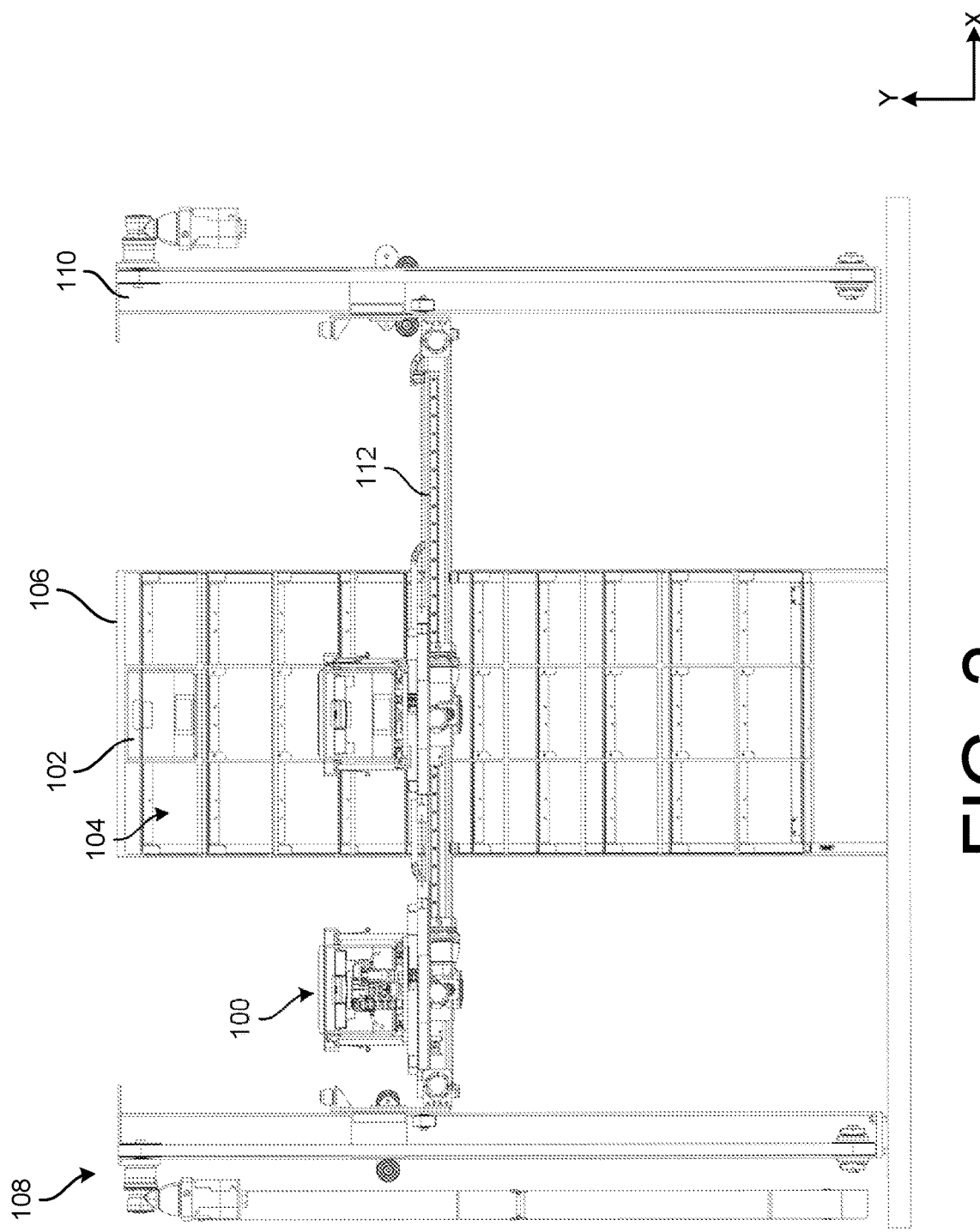
FIG. 2 illustrates a front view of the positioning system with the head assemblies of FIG. 1, according to examples of the present disclosure.

FIG. 2 illustrates a front view of the positioning system 108, the head assemblies 100, and the storage rack 106, according to examples of the present disclosure. As discussed above in relation to FIG. 1, the lifts 110 are configured to vertically move the tracks 112, and correspondingly, the head assemblies 100. For example, the lifts 110 may vertically position the head assemblies 100 relative to the storage rack 106. The tracks 112, meanwhile, may actuate to horizontally position the head assemblies 100 relative to the storage rack 106. The head assemblies 100 themselves, may also be configured to move and/or rotate. As such, the positioning system 108 and the head assemblies 100 may operate to position the head assemblies 100 relative to the storage rack 106 to transfer the container 102 into the slots 104.

As shown, the slots 104 define a cavity that are sized to receive the containers 102. The slots 104 include one or more sides, a top, and a bottom. The sides may be disposed between adjacent slots 104, or between the slots 104 and sides of the storage rack 106. As the conveyance mechanism 114 actuates to transfer the containers 102 into the slots 104, the container 102 may contact the one or more sides, the top, and/or the bottom. For example, if the container 102 is misaligned on the slot 104, the container 102 may contact the storage rack 106. This contact, that is, the pushing of the container 102 into the storage rack 106, may cause the storage rack 106 to tip over (e.g., about the X-axis) and/or otherwise reposition within the environment and/or on the robotic drive. However, the energy limiting device 124 effectuates to counteract this contact by translating the engagement mechanism 122 away from the storage rack 106 to avoid the conveyance mechanism 114 further pushing the container 102 into the storage rack 106. In such instances, given that the engagement mechanism 122 becomes disengaged with the container 102, the energy limiting device 124 limits the engagement mechanism 122 further pushing the container 102 into the storage rack 106 over a certain distance (e.g., during deacceleration of the conveyance mechanism 114).

The storage rack 106 is shown having a certain size and shape. In some instances, the storage rack 106 may include a different size and/or shape as shown, and/or may include more than or less than the amount of slots 104 as shown. The slots 104 in some instances may be square or rectangular, however, other shapes are envisioned. Moreover, not all the slots 104 may be the same, and in some instances, more than one container 102 may be transferred into the slots 104, respectively.

The containers 102 may be or include a container or a bin with an interior area for containing one or more items. The containers 102 may include rigid or semi-rigid material, for example, plastic, cardboard, paper, or any suitable material for containing items. In some instances, the containers 102 can include handles, hooks, engagement surfaces, suctionable surfaces, or other features and/or components for engaging with the engagement mechanism 122. In other examples, the containers 102 may be items, such that the items are moved by the engagement mechanism 122, or the conveyance mechanism 114, without first being positioned in the container 102.

Figure 3:
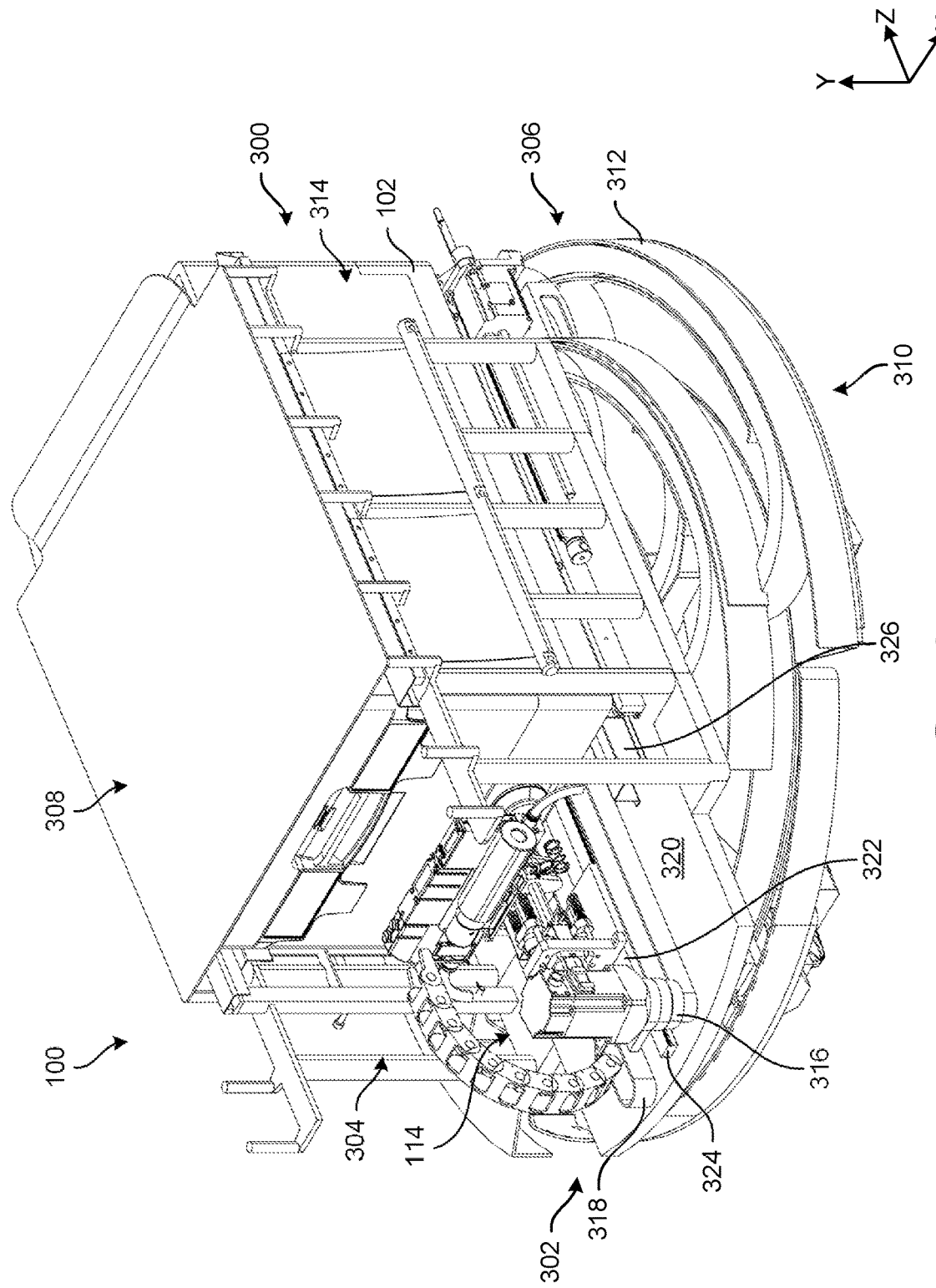
FIG. 3 illustrates a perspective view of the head assembly of FIG. 1, according to examples of the present disclosure.

FIG. 3 illustrates a perspective view of the head assembly 100, according to examples of the present disclosure. In some instances, the head assembly 100 includes a front 300, a back 302 spaced apart from the front 300 (e.g., in the Z-direction), a first side 304, a second side 306 spaced apart from the first side 304 (e.g., in the X-direction), a top 308, and a bottom 310 spaced apart from the top 308 (e.g., in the Y-direction). In some instances, the bottom 310 is configured to couple to the tracks 112 of the positioning system 108. For example, the head assembly 100 may include a base 312 that couples to the tracks 112. In some instances, the base 312 itself may be configured to rotate (e.g., about the Y-axis).

The head assembly 100 includes a bay 314 (e.g., compartment, interior space, cavity, etc.) that is sized to receive the container 102. As shown, when residing within the bay 314, the container 102 may be enclosed at sides (e.g., between the first side 304 and the second side 306), a top, a bottom, as well as a first end (e.g., the back 302). A second end of the container 102, opposite the first end, may be pushed into the slot 104. That is, when transferred into the storage rack 106, the container 102 may be pushed out the front 300 of the head assembly 100. Correspondingly, when transferring the container 102 into the bay 314, the container 102 may be pulled into the bay 314 through the front 300.

As will be explained herein, the head assembly 100 includes the conveyance mechanism 114 that is configured to load the container 102 into the head assembly 100 and load the container 102 into the storage rack 106. In some instances, the conveyance mechanism 114 is located proximate to the back 302 of the head assembly 100. The conveyance mechanism 114 is configured to translate (e.g., in the Z-direction) for transferring the container 102 into and/or from the storage rack 106. In some instances, the conveyance mechanism 114 may grip, attach, or otherwise couple to the container 102 and actuate to push the container 102 out of the head assembly 100 (e.g., to unload the container 102) or to pull the container 102 into the bay 314 of the head assembly 100 (e.g., to load the container 102).

In some instances, the conveyance mechanism 114 may include one or more actuator(s) 316 that drive one or more belts 318. In some instances, the belts 318 may be rotationally coupled to a base plate 320. The base plate 320 may be coupled to the base 312. Additionally, the conveyance mechanism 114 may include a carriage 322 disposed on a rail 324. During actuation of the belts 318 via the actuator(s) 316, the carriage 322 may translate along the rail 324. For example, a first actuation of the actuator(s) 316 may drive the belts 318 in a first direction to push the container 102 out of the head assembly 100, while a second actuation of the actuator(s) 316 may drive the belts 318 in a second direction to pull the container 102 into the head assembly 100. Additionally, the second actuation that drives the belts 318 in the second direction may retract the conveyance mechanism 114 into the head assembly 100 following a transferring of the container 102 into the storage rack 106. In some instances, the container 102 rests on the base plate 320, one or more slides 326 coupled to the base plate 320.

Figure 4:
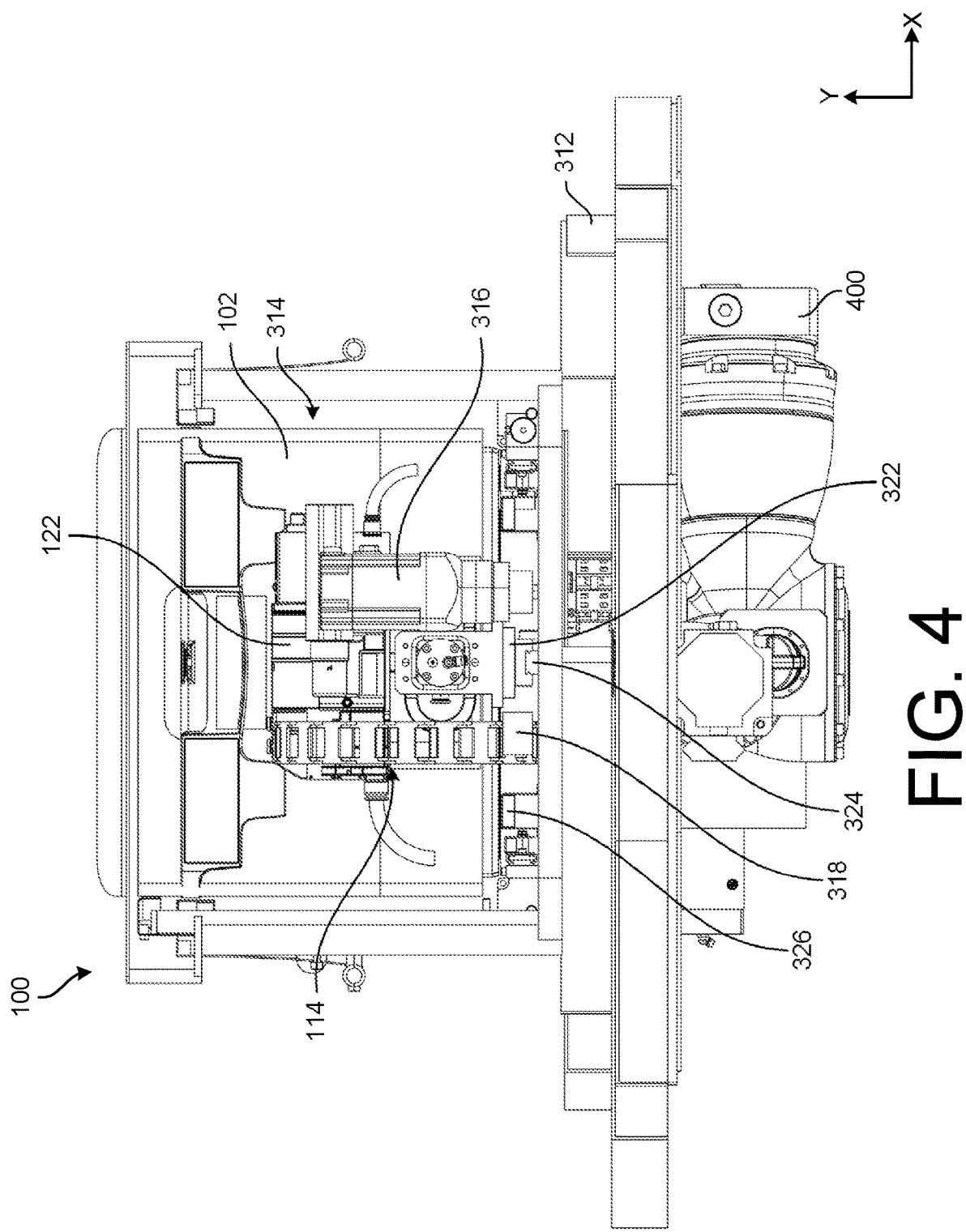
FIG. 4 illustrates an end view of the head assembly of FIG. 1, according to examples of the present disclosure.

FIG. 4 illustrates an end view of the head assembly 100, such as the back 302, according to examples of the present disclosure. The head assembly 100 includes motors and/or gearboxes 400 that may rotate the base 312 to change an orientation of the head assembly 100. For example, to align the head assembly 100 relative to the slots 104 on the storage rack 106, the motors and/or gearboxes 400 may rotate the base 312. Additionally, the motors and/or gearboxes 400 may rotate the base 312 to permit the head assembly 100 to transfer containers 102 between different storage racks 106 (e.g., the head assembly 100 may be positioned between two storage racks 106).

As introduced above with regard to FIG. 3, the container 102 may reside within the bay 314 of the head assembly 100. The conveyance mechanism 114 includes the actuator(s) 316 that effectuate to transfer the container 102 to and from the head assembly 100. The container 102 is shown residing on the slides 326, and the conveyance mechanism 114, via movement of the belts 318, may drive the carriage 322 along the rail 324. The engagement between the carriage 322 and the rail 324 may maintain an alignment of the container 102 being pushed out or pulled into the bay 314.

The head assembly 100 may also include the engagement mechanism 122 that, in some instances, suctions, magnetically engages, hooks onto, or otherwise engages with the container 102. The engagement mechanism 122 may, in some instances, be a component of the conveyance mechanism 114 and is configured to translate with the conveyance mechanism 114. For example, the engagement mechanism 122 may be coupled to the carriage 322. In some instances, when the engagement mechanism 122 suctions to the container 102, the engagement mechanism 122 includes one or more pumps, air supplies, motors, and/or vacuums to suction against the container 102 to hold the container 102 during loading and unloading.

Figure 5:
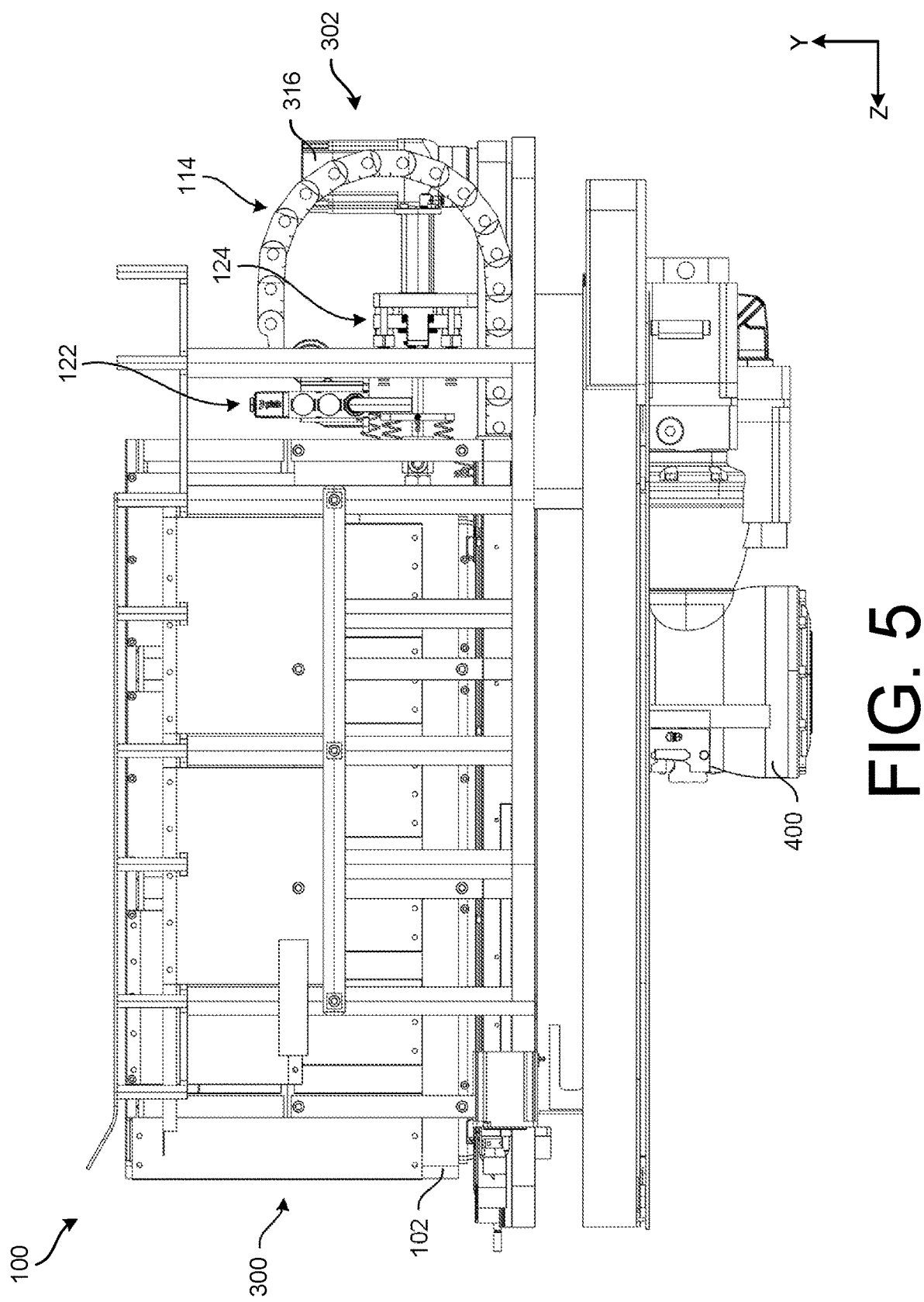
FIG. 5 illustrates a side view of the head assembly of FIG. 1, according to examples of the present disclosure.

FIG. 5 illustrates a side view of the head assembly 100, such as the first side 304, according to examples of the present disclosure. To unload the container 102 from the head assembly 100, as shown in FIG. 5, the conveyance mechanism 114 may actuate to translate in the Z-direction towards the front 300. In effect, the container 102 is pushed out the front 300 during actuation of the actuator(s) 316. As the conveyance mechanism 114 is actuated, the carriage 322 may translate along the rail 324 (obscured in FIG. 5). Given the coupling of the engagement mechanism 122 to the carriage 322, the engagement mechanism 122 may correspondingly move during actuation of the conveyance mechanism 114.

Further, the conveyance mechanism 114 may include the energy limiting device 124 coupled to the carriage 322 and the engagement mechanism 122 (e.g., between the carriage 322 and the engagement mechanism 122). In some instances, the energy limiting device 124 couples the engagement mechanism 122 to the conveyance mechanism 114. Details of the energy limiting device 124 are discussed herein. However, generally, the energy limiting device 124 is configured to limit energy being imparted to the container 102 in the event that the container 102 contacts the storage rack 106 during transferring of the container 102 into the storage rack 106. For example, during a transfer of the container 102 into the slot 104, if the container 102 is not aligned on the slot 104, the container 102 may contact portions of the storage rack 106. For example, if the container 102 is not aligned on the slot 104, the container 102 may be pushed into contact with the storage rack 106. During this instance, the energy limiting device 124 of the head assembly 100 may function to translate the engagement mechanism 122 in a direction opposite to translation of the conveyance mechanism 114 (i.e., away from the storage rack 106). This avoids energy being imparted to the container 102 and/or the storage rack 106 as the conveyance mechanism 114 further actuates towards the storage rack 106 and/or during a deacceleration of the conveyance mechanism 114.

For example, if the conveyance mechanism is translating in a first direction to push the container 102 out the front 300, in the event that the container 102 contacts the storage rack 106, a resistance is applied to the container 102. This resistance imparts force to the container 102, and to avoid further pushing the container 102 into contact with the storage rack 106, the energy limiting device 124 may function to translate (e.g., collapse) the engagement mechanism 122 in a second direction towards the back 302 (e.g., opposite the first direction). The conveyance mechanism 114, meanwhile, may continue to advance in the first direction. That is, the energy limiting device 124 may translate the engagement mechanism 122 in the second direction, while the conveyance mechanism 114 moves in the first direction. However, being as the engagement mechanism 122 may no longer engage with the container 102, even as the conveyance mechanism 114 moves in the first direction, the engagement mechanism 114 avoids pushing the container 102 into further contact with the storage rack 106 and imparting energy to the storage rack 106. The sensor 126 of the energy limiting device 124 senses such movement, and in turn, the actuator(s) 316 are instructed to stop or halt movement of the conveyance mechanism 114. Therein, the carriage 322 may come to a stop. The energy limiting device 124 therefore avoids the conveyance mechanism 114 further pushing the container 102 into the storage rack 106 while the conveyance mechanism 114 responds and/or deaccelerates the actuator(s) 316 to stop movement of the carriage 322.

As the conveyance mechanism 114 comes to a stop, the engagement mechanism 122 may reengage with the container 102. The head assembly 100, whether via the motors and/or gearboxes 400 or the positioning system 108, may actuate align the head assembly 100 on the storage rack 106.

Figure 6A:
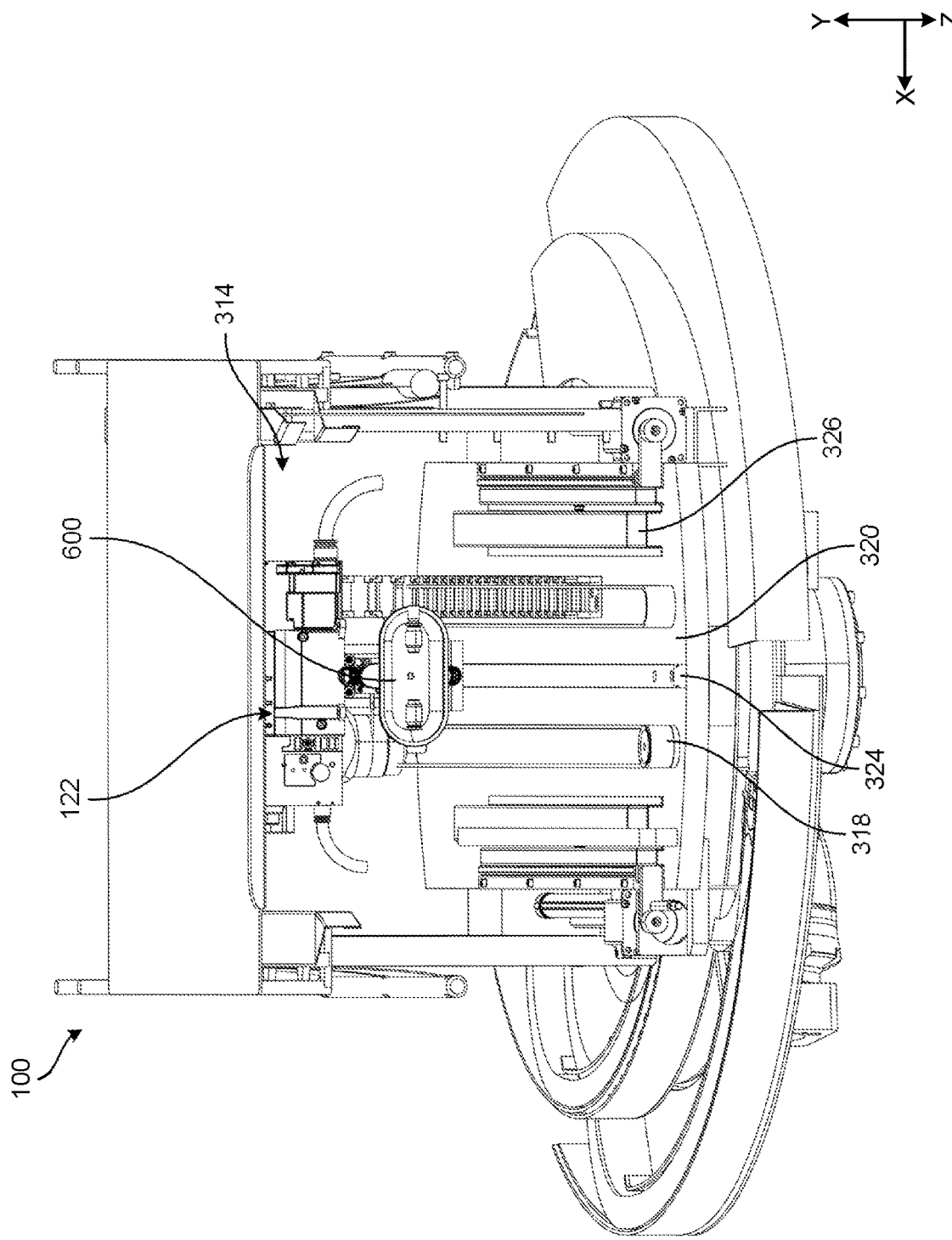
FIGS. 6A and 6B illustrates an example bay of the head assembly of FIG. 1 that is configured to receive a container, according to examples of the present disclosure.
Figure 6B:
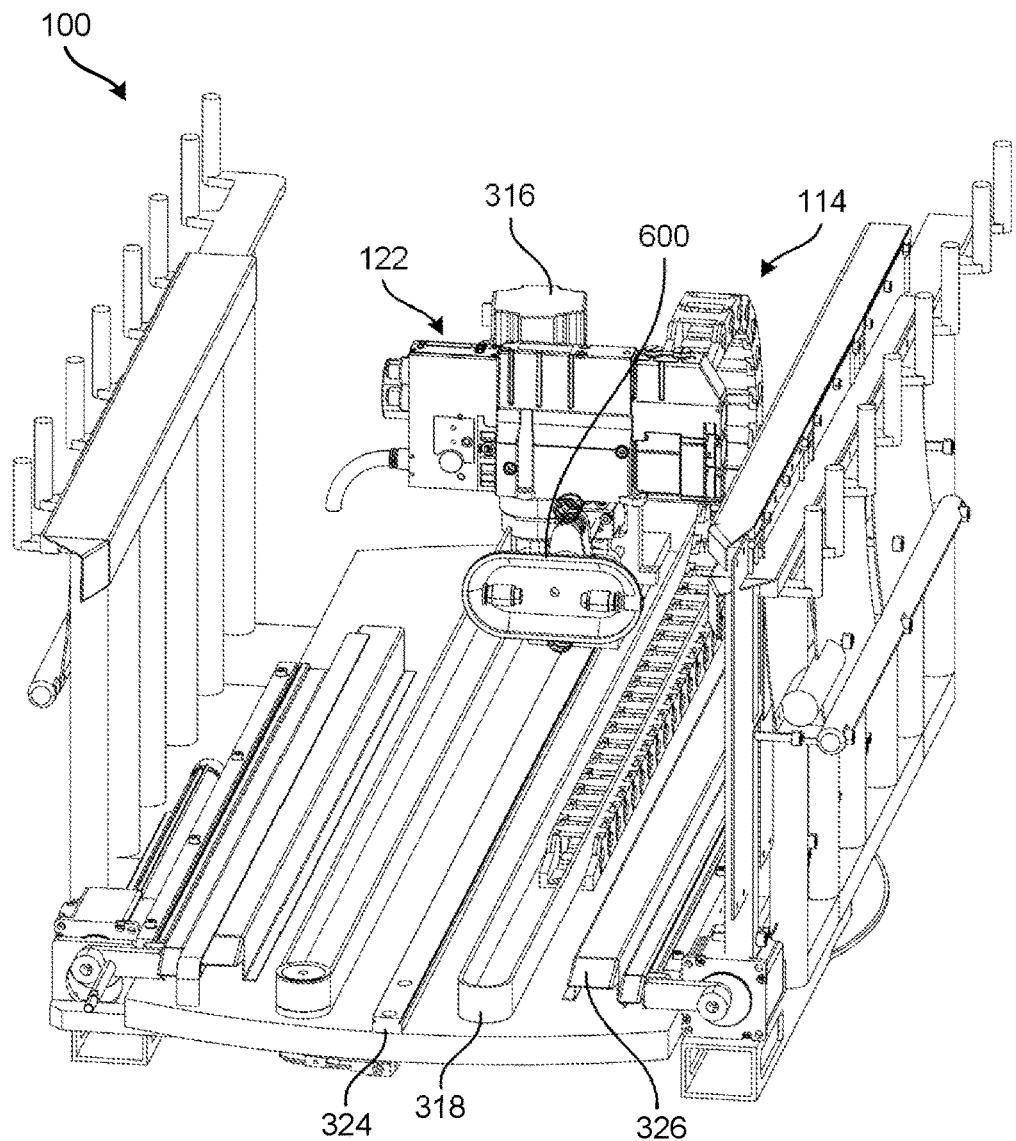
Figure 6B:
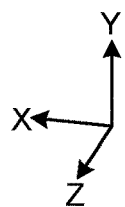

FIGS. 6A and 6B illustrates an end view of the head assembly 100, such as the front 300, according to examples of the present disclosure. In FIGS. 6A and 6B, the bay 314 of the head assembly 100 is shown being empty, with no container 102 residing therein. In FIG. 6B, a top of the head assembly 100 is shown being open (e.g., with a top plate removed) to further illustrate the bay 314.

The belts 318, the slides 326, and the rail 324 are shown coupled to or disposed on the base plate 320. In some instances, the slides 326 may at least partially extend out of the head assembly 100 to support a weight of the container 102 during loading and unloading. The engagement mechanism 122, as discussed herein, may include an engagement device 600 (e.g., a suction cup) that engages to an end of the container 102. The engagement mechanism 122, including the engagement device 600, is configured to translate along the rail 324 during actuation of the actuator(s) 316. The engagement device 600 may be turned on and off, engaged and disengaged, for example, via the control system 116 and based on a current progress of transferring the container 102. Further, the engagement device 600 may operably couple to the energy limiting device 124 for imparting force to the energy limiting device 124. For example, if the container 102 contacts the storage rack 106, force may be imparted into the engagement device 600. The energy limiting device 124 couples to the engagement device 600 such that the force is transferred to the energy limiting device 124.

In instances in which the engagement mechanism 122 resembles suction mechanisms, one or more hoses, pipes, etc. may route between a vacuum or pump of the engagement mechanism 122 and the engagement device 600. The engagement device 600 of the engagement mechanism 122 may be controlled at least in part via the control system 116 such that the engagement device 600 engages with the container 102 at proper instances during loading and unloading.

Figure 7A:
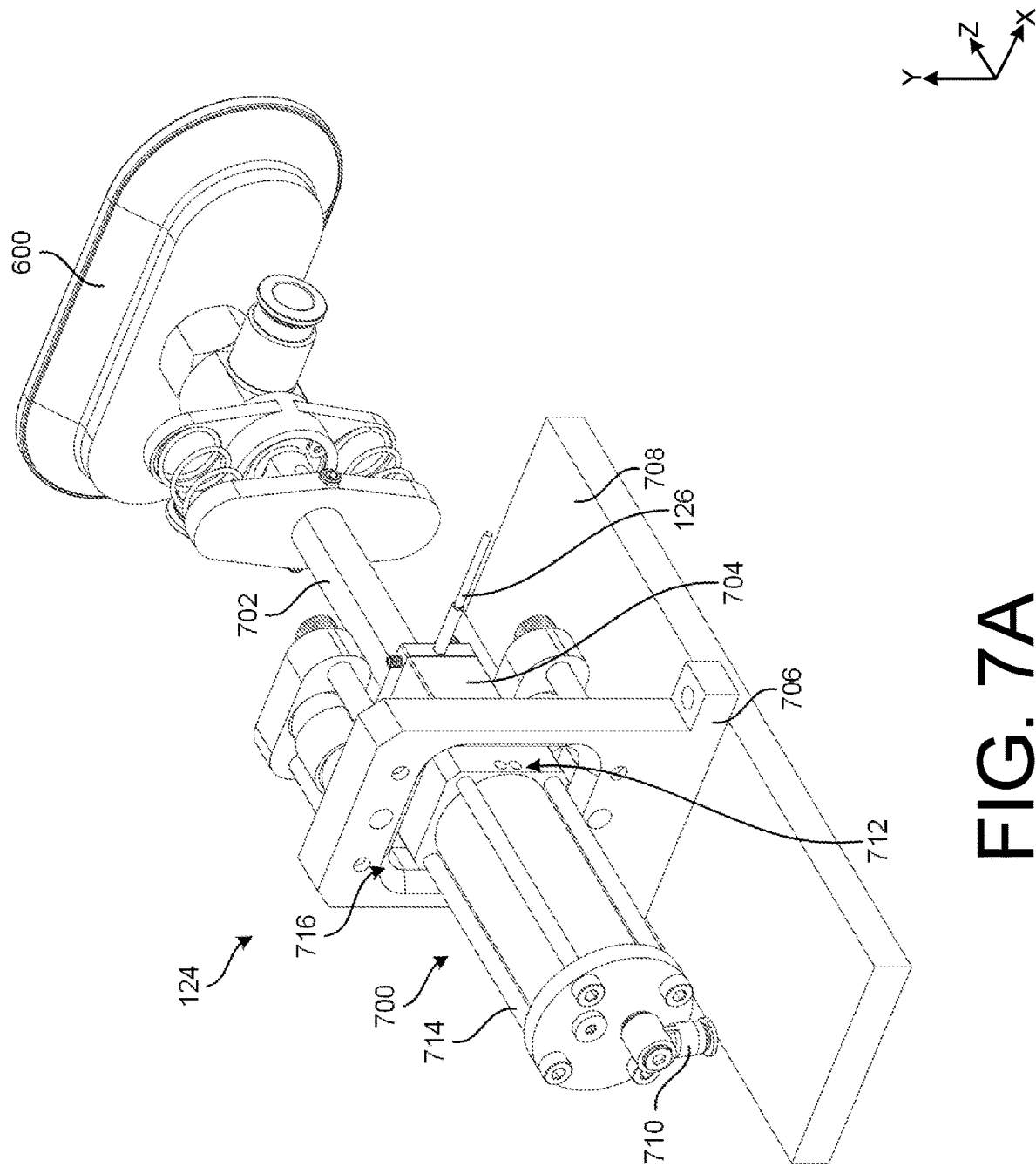
FIGS. 7A-7C illustrate an example energy limiting device of the head assembly of FIG. 1, according to examples of the present disclosure.
Figure 7B:
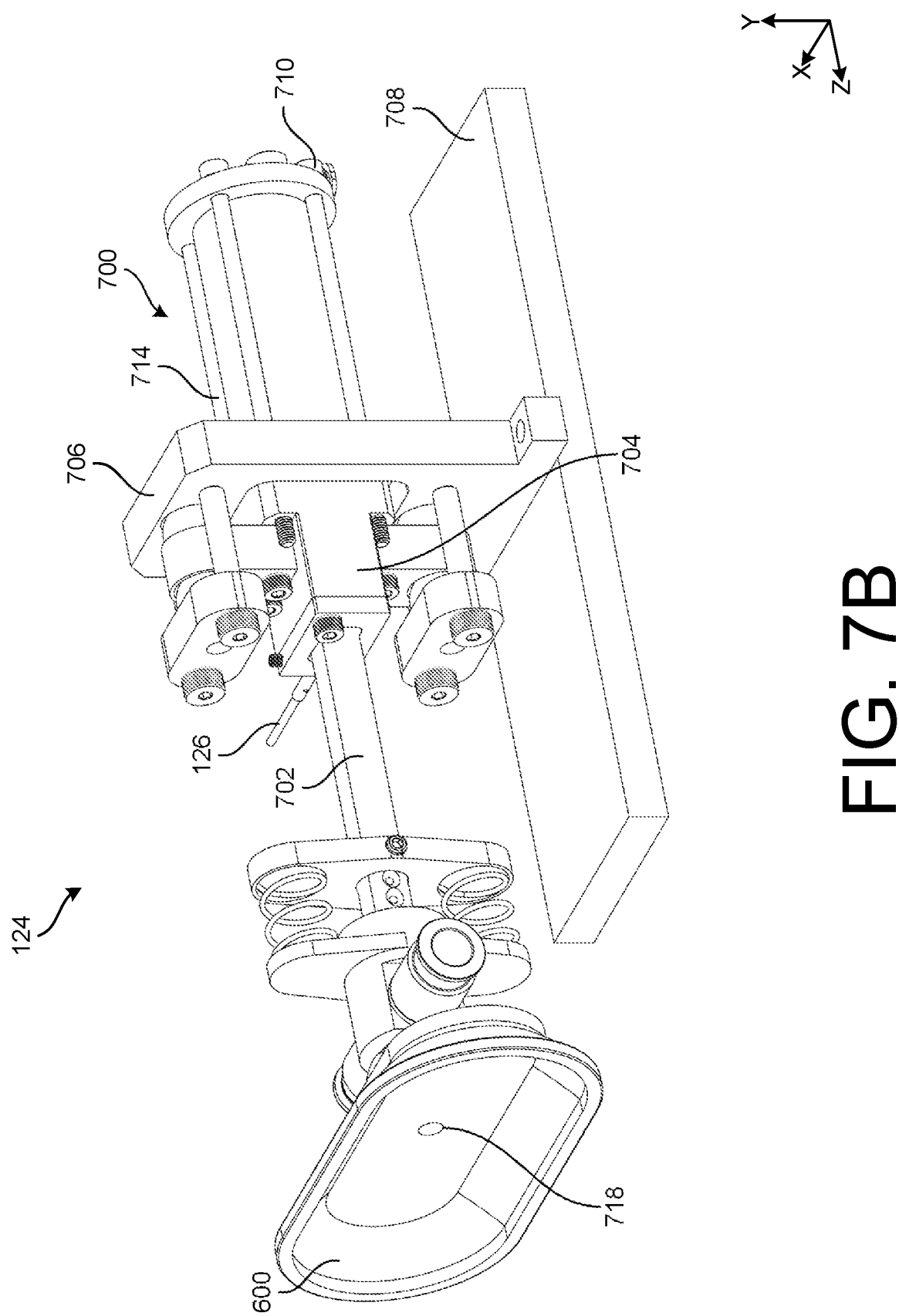
Figure 7C:
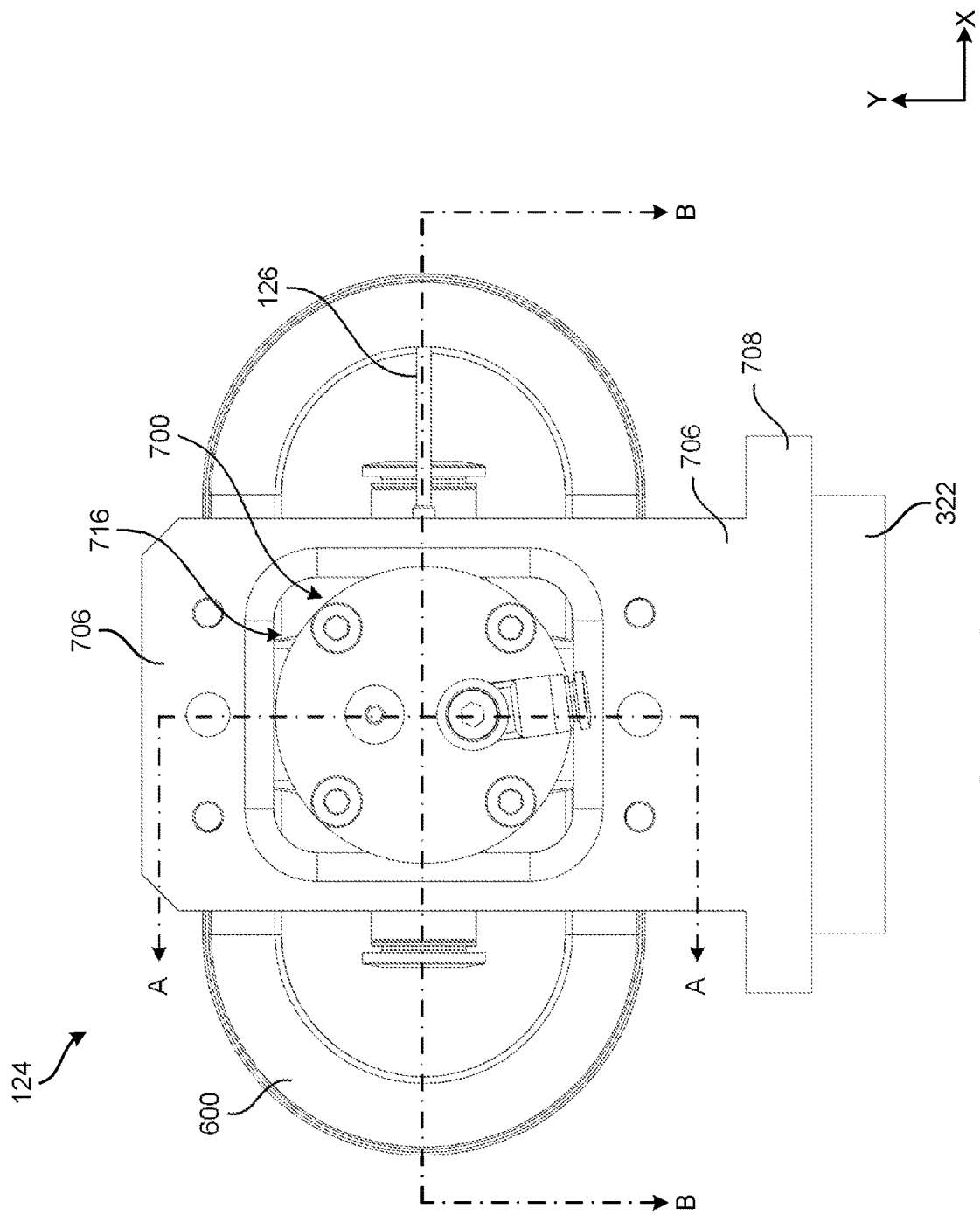

FIGS. 7A-7C illustrate the energy limiting device 124, according to examples of the present disclosure. In some instances, FIG. 7A illustrates a rear perspective view of the energy limiting device 124, FIG. 7B illustrates a front perspective view of the energy limiting device 124, and FIG. 7C illustrates an end view of the energy limiting device 124. The energy limiting device 124 as shown in FIGS. 7A-7C is just one example of an energy limiting device that may be usable with the head assembly 100. As such, it is to be understood that other energy limiting devices may be implemented or otherwise integrated within the head assembly 100.

In some instances, the energy limiting device 124 includes an air cylinder 700, a poppet valve 702, a sleeve 704, a frame 706, and a bracket 708. The air cylinder 700 may include an inlet port 710, which supplies air into the air cylinder 700. The poppet valve 702 resides at least partially within the air cylinder 700 and the sleeve 704. For example, a first end of the poppet valve 702 may reside within the air cylinder 700, while a second end of the poppet valve 702 may be disposed external to the air cylinder 700. The second end may couple to the engagement device 600. As will be explained herein, when the poppet valve 702 vents air, the poppet valve 702 may be translated into or collapsed within the air cylinder 700. In turn, given the coupling between the poppet valve 702 and the engagement device 600, the engagement device 600 may translate the container 102 away from the storage rack 106. In other instances, the engagement device 600 may disengage with the container 102 such that the engagement device 600 no longer pushes on the container 102.

In some instances, the sleeve 704 defines one or more vents 712 through which air is vented during operation of the poppet valve 702. For example, as the poppet valve 702 translates within the air cylinder 700, the air within the air cylinder 700 may vent into the environment via the vents 712. The poppet valve 702 may therefore collapse within the air cylinder 700 such that air is vented and the air cylinder 700 is no longer pressurized to push on the container 102. In some instances, the sleeve 704 may include any number of vents 712, and the vents 712 may be located on opposing or multiple sides of the sleeve 704.

In some instances, the air cylinder 700 couples to the sleeve 704 via one or more fasteners 714. The sleeve 704 and/or the air cylinder 700 may also couple to the frame 706. Additionally, as shown, the sleeve 704 and/or the air cylinder 700 may be mounted through an opening 716 of the frame 706. In doing so, the sleeve 704 and/or the air cylinder 700 may be disposed at least partially through or within the frame 706. The frame 706 couples to the bracket 708, which in turn, may be coupled to the carriage 322. As such, during translation of the carriage 322, the energy limiting device 124 and the engagement device 600 are configured to translate as well.

In some instances, the sensor 126 is coupled to the sleeve 704 at a location external to the air cylinder 700. The sensor 126 is arranged to sense a translation of the poppet valve 702 (e.g., a length, such as a stem, of the poppet valve 702 between the first end and the second end). For example, when the poppet valve 702 translates within the air cylinder 700, the sensor 126 may sense translation of the poppet valve 702 relative to the conveyance mechanism 114. Correspondingly, the control system 116 may function to halt movement of the conveyance mechanism 114. However, given that the poppet valve 702 has already translated within/into the air cylinder 700, the conveyance mechanism 114 avoids further pushing the container 102 further into contact with the storage rack 106 as the conveyance mechanism 114 deaccelerates. In some instances, the sensor 126 is in wired or wireless connection with the control system 116.

The engagement device 600 may include an orifice 718 (e.g., air inlet) that fluidly connects the engagement device 600 to pump(s) of the engagement mechanism 122. For example, the pump(s) may take in air through the orifice 718 for engaging the engagement device 600 with the container 102.

Figure 8:
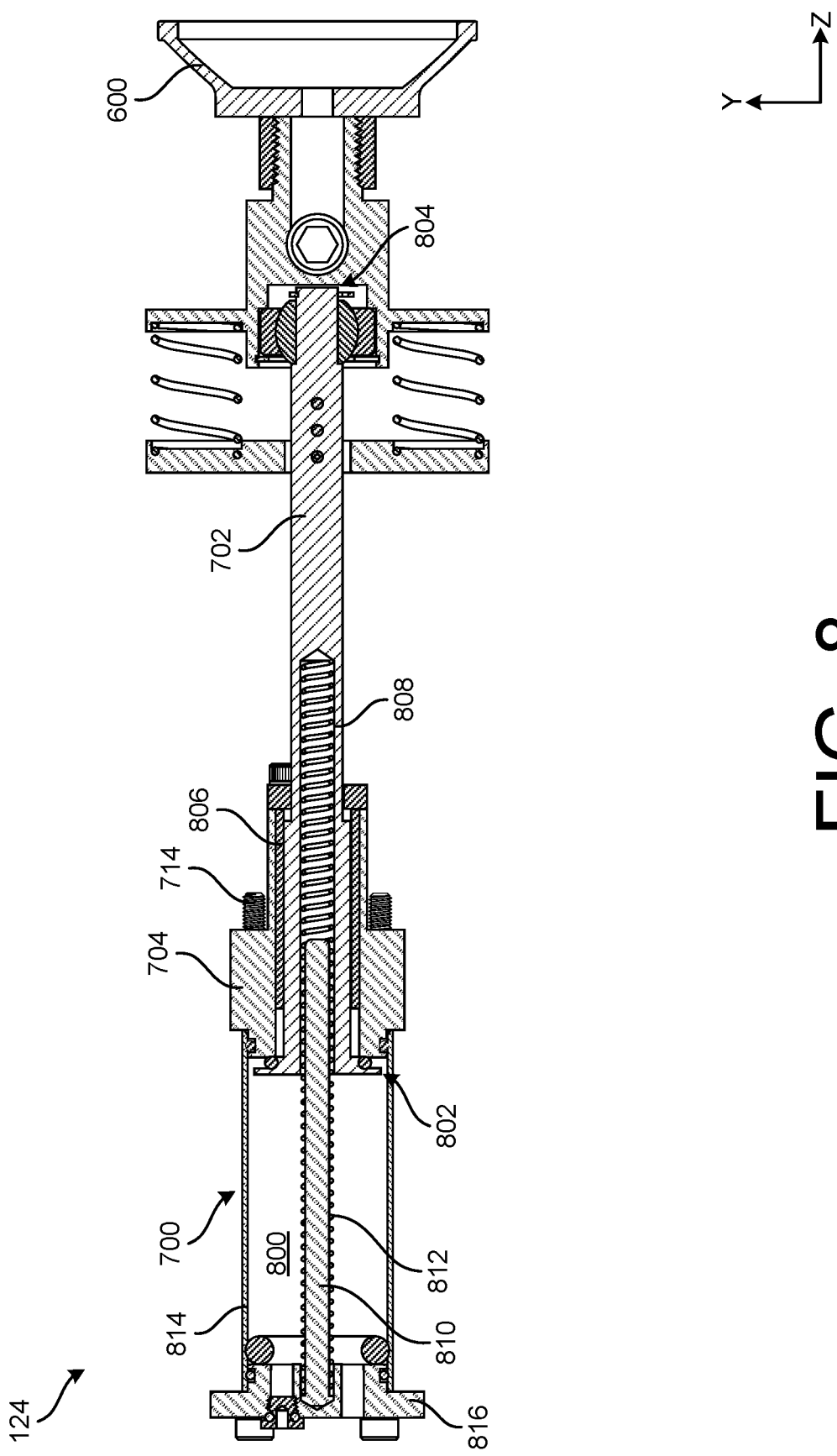
FIG. 8 illustrates a cross-sectional view of the energy limiting device of FIGS. 7A-7C, taken along line A-A of FIG. 7C, according to examples of the present disclosure.
Figure 9:
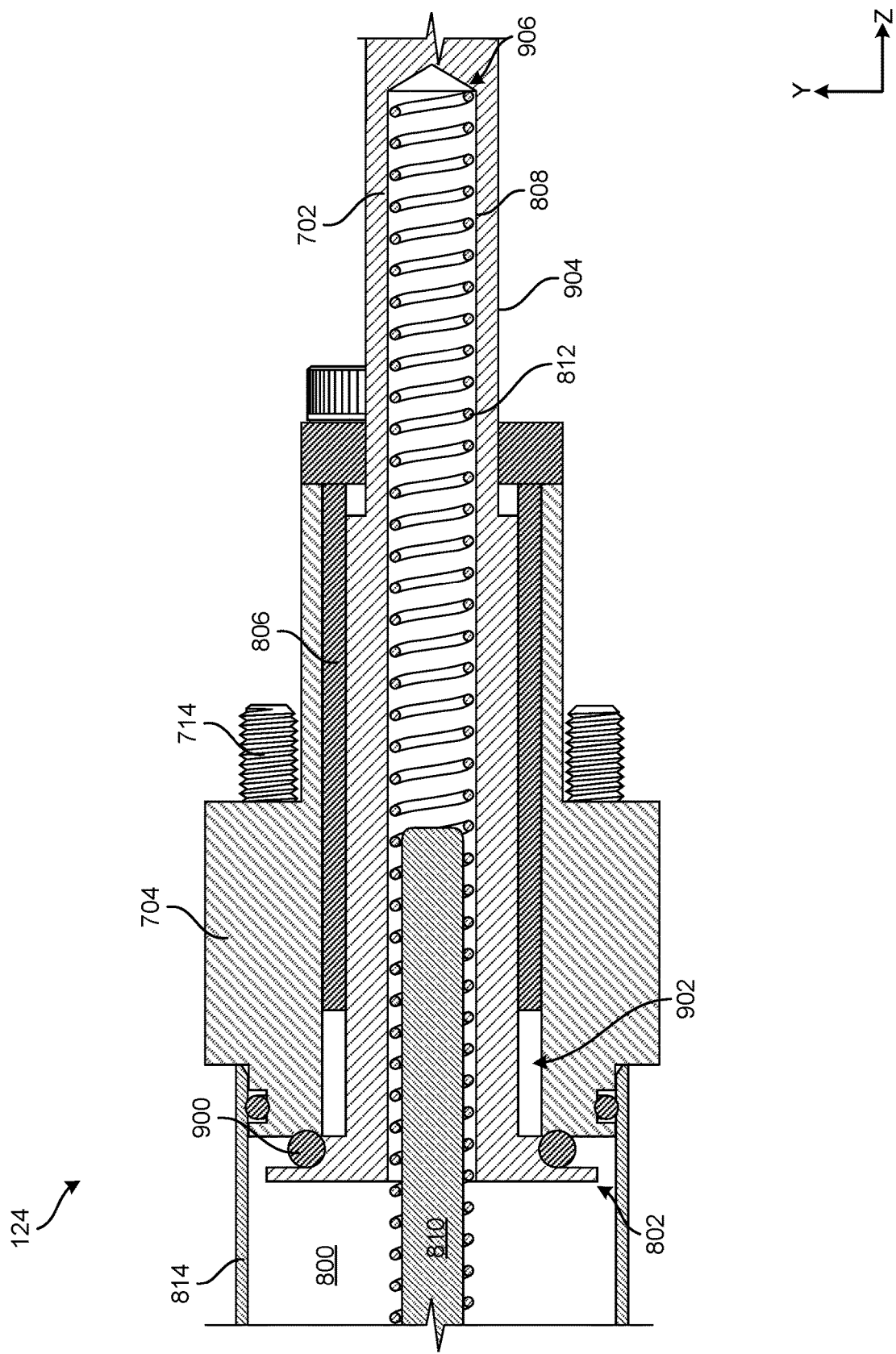
FIG. 9 illustrates a detailed view of the cross-sectional view of FIG. 8, according to examples of the present disclosure.
Figure 10:
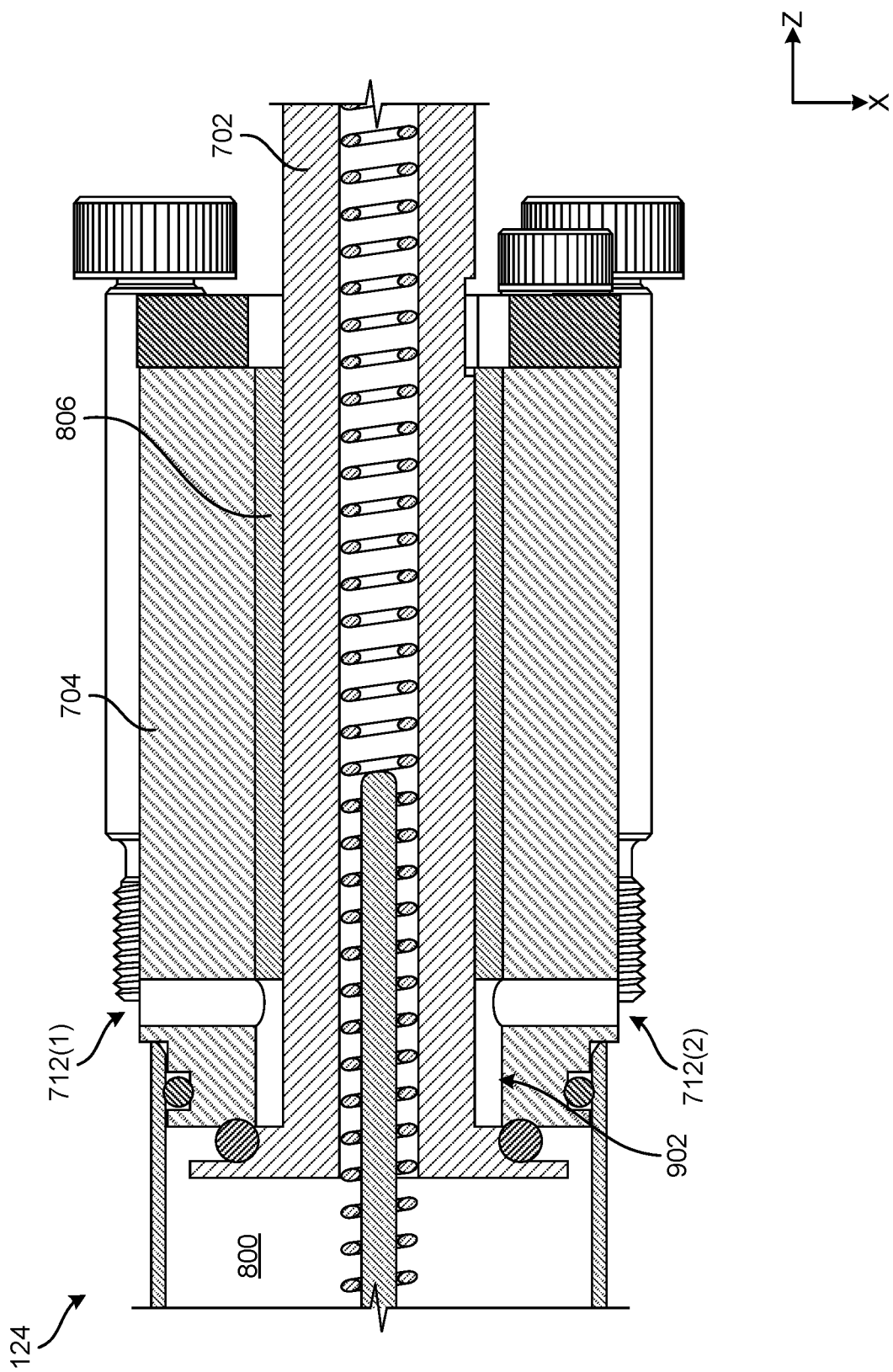
FIG. 10 illustrates a cross-sectional view of the energy limiting device of FIGS. 7A-7C, taken along line B-B of FIG. 7C, according to examples of the present disclosure.

In FIG. 7C, a line A-A is shown, which is used to illustrate a cross-sectional view of the energy limiting device 124 in FIGS. 8 and 9, and a line B-B is shown, which is used to illustrate a cross-sectional view of the energy limiting device 124 in FIG. 10.

FIG. 8 illustrates a cross-sectional view of the energy limiting device 124, taken along line A-A of FIG. 7C, according to examples of the present disclosure. As introduced above in FIGS. 7A-7C, the energy limiting device 124 includes the air cylinder 700, the sleeve 704, and the poppet valve 702. The air cylinder 700 may define a chamber 800 that is pressurized with air (e.g., via the inlet port 710). The air cylinder 700 couples to the sleeve 704, for example, via the fasteners 714, for sealing the chamber 800.

The poppet valve 702 includes a first end 802 and a second end 804 spaced apart from the first end 802 (e.g., in the Z-direction). The first end 802 may be disposed within the air cylinder 700 and is configured to engage with a surface of the sleeve 704 to seal the chamber 800. The second end 804 may be disposed external to the air cylinder 700 and may couple to the engagement device 600. The engagement between the first end 802 and the sleeve 704 may resemble a poppet valve to exhaust (e.g., vent) air through the vents 712. That is, in FIG. 8, the first end 802 is shown seated against the sleeve 704 to seal the chamber 800. However, the first end 802 may be unseated from the sleeve 704 such that air may be exhausted out the vents 712. More particularly, when the container 102 contacts the storage rack 106, force is imparted to the poppet valve 702 given the coupling with the engagement device 600. As the force is imparted to the poppet valve 702, the poppet valve 702 may displace from the sleeve 704, causing the poppet valve 702 to exhaust air, and subsequently the air may vent through the vents 712. The reduction in pressure within the chamber 800 causes the poppet valve 702 to collapse within the chamber 800 and in turn, translates the engagement device 600 away from the container 102. In doing so, the engagement device 600 no longer engages with the container 102, and the conveyance mechanism 114 avoids pushing the container 102 further into the storage rack 106, despite the continued motion of the conveyance mechanism 114 (e.g., until the sensor 126 senses the translation of the poppet valve 702 and the actuator(s) 316 are controlled to stop). However, the first end 802 seats against the sleeve 704 when the force is less than a threshold amount such that movement of the carriage 322 is imparted to the poppet valve 702. That is, in these instances, the poppet valve 702 is closed and the engagement mechanism 122 may engage the container 102 to transfer the container 102 into the slot 104 of the storage rack 106.

As will be discussed herein with regard to FIG. 9, the sleeve 704 may define a passageway within which the poppet valve 702 is disposed. A bushing 806 may reside within the passageway. The poppet valve 702 is configured to translate within the passageway and engage with the bushing 806. Further, the poppet valve 702 may define a channel 808 that receives a rod 810 and/or a biasing member 812. As shown, the rod 810 resides at least partially within the poppet valve 702 and the biasing member 812 may be disposed about the rod 810. The biasing member 812 extends between an end of the rod 810 and an end of the channel 808, spaced apart from the end of the rod 810. During a translation of the poppet valve 702 into the chamber 800, the biasing member 812 serves to bias the first end 802 of the poppet valve 702 back against the sleeve 704. For example, the biasing member 812 urges the first end 802 against the sleeve 704 to seal the poppet valve 702 against the sleeve 704, and correspondingly, seal the chamber 800. The channel 808 is open to the chamber 800 for receiving the rod 810 and the biasing member 812.

In some instances, the air cylinder 700 includes a housing 814 that defines the chamber 800, and which engages with the sleeve 704. The air cylinder 700 may further include a cap 816 disposed opposite the sleeve 704, that encloses an end of the chamber 800, opposite the sleeve 704. In some instances, the inlet port 710 is disposed through or coupled to the cap 816. Additionally, the rod 810 may be engaged with the cap 816. For example, the rod 810 may be received within a pocket of the cap 816. The housing 814 may be sealed against the sleeve 704 and/or the cap 816 via one or more seals (e.g., O-rings, gaskets, bushings, adhesives, etc.).

FIG. 9 illustrates a cross-sectional view of the energy limiting device 124, taken along line A-A of FIG. 7C, showing a detailed view of an engagement between the poppet valve 702 and the sleeve 704, according to examples of the present disclosure.

As shown, the first end 802 of the poppet valve 702 may seal against the sleeve 704. A pressure within the chamber 800 may force the first end 802 of the poppet valve 702 against the sleeve 704. For example, as air is supplied into the chamber 800, via the inlet port 710, the chamber 800 may become pressurized and force the first end 802 of the poppet valve 702 against the sleeve 704. An O-ring 900, for example, may seal the first end 802 against the sleeve 704 to prevent air routing around the first end 802 and ultimately, out the vents 712. In this position of the poppet valve 702 (e.g., when the first end 802 is seated against the sleeve 704), the engagement mechanism 122 may engage the container 102 and the conveyance mechanism 114 may be actuated to transfer the container 102 into the storage rack 106. That is, the pressure within the chamber 800 may be sufficient to prevent translation of the poppet valve 702 into the chamber 800. However, in the event that the container 102 contacts the storage rack 106, such as if the container 102 is misaligned, force is imparted to the poppet valve 702 and if sufficient enough, may unseat the first end 802 from the sleeve 704. In turn, the poppet valve 702 may translate or collapse within the chamber 800. Although not shown in FIG. 9, the vents 712 may be in fluid connection with a passageway 902 defined by the sleeve 704. In the event that the first end 802 is translated in a direction away from the sleeve 704, the poppet valve 702 may exhaust air and the air may route around the first end 802, into the passageway 902, and out the vents 712. In some instances, the amount of air pressure within the chamber 800 may be adjusted to control the amount of force required to for the poppet valve 702 to vent the air within the chamber 800.

As shown, the bushing 806 may reside within the passageway 902 and may be in contact with an exterior surface 904 of the poppet valve 702. The bushing 806 may assist in sealing the poppet valve 702 against the sleeve 704, for routing air through the vents 712, and/or seating the poppet valve 702 within the sleeve 704. Additionally, the bushing 806 permits the poppet valve 702 to translate within the sleeve 704.

The rod 810 is at least partially disposed within the channel 808 of the poppet valve 702. As shown, the channel 808 may be formed into/within the first end 802 of the poppet valve 702. The channel 808 may include an end 906, and the biasing member 812 may be disposed against the end 906. The biasing member 812 may also be disposed against the cap 816. During translation of the poppet valve 702 into the chamber 800, the biasing member 812 may be compressed given the engagement between the biasing member 812 and the end 906 of the channel 808. That is, translation of the poppet valve 702 may overcome a force of the biasing member 812. However, following such translation and when force is no longer imparted to the energy limiting device 124, the biasing member 812 may press against the end 906 of the channel 808 to urge the first end 802 of the poppet valve 702 back into contact with the sleeve 704. In doing so, the chamber 800 may be sealed such that the conveyance mechanism 114 may resume transferring of the container 102 into the slot 104 (following a realignment of the head assembly 100 via the positioning system 108 and/or the head assembly 100). The biasing member 812 may therefore serve to automatically reset the energy limiting device 124.

FIG. 10 illustrates a cross-sectional view of the energy limiting device 124, taken along line B-B of FIG. 7C, according to examples of the present disclosure.

The sleeve 704 defines the vents 712, such as first vents 712(1) and second vents 712(2). In some instances, the first vents 712(1) may be disposed on a first side of the sleeve 704, while the second vents 712(2) may be disposed on a second side of the sleeve 704, opposite the first side. In some instances, the sleeve 704 may define two first vents 712(1) and two second vents 712(2). The first vents 712(1) and the second vents 712(2) are shown being fluidly connected to the passageway 902 of the sleeve 704, in order to vent air into an environment following a translation of the poppet valve 702 into the chamber 800. The bushing 806 is further shown in contact with the poppet valve 702 and the passageway 902 to seat and/or seal the poppet valve 702 within the sleeve 704.

Figure 11:
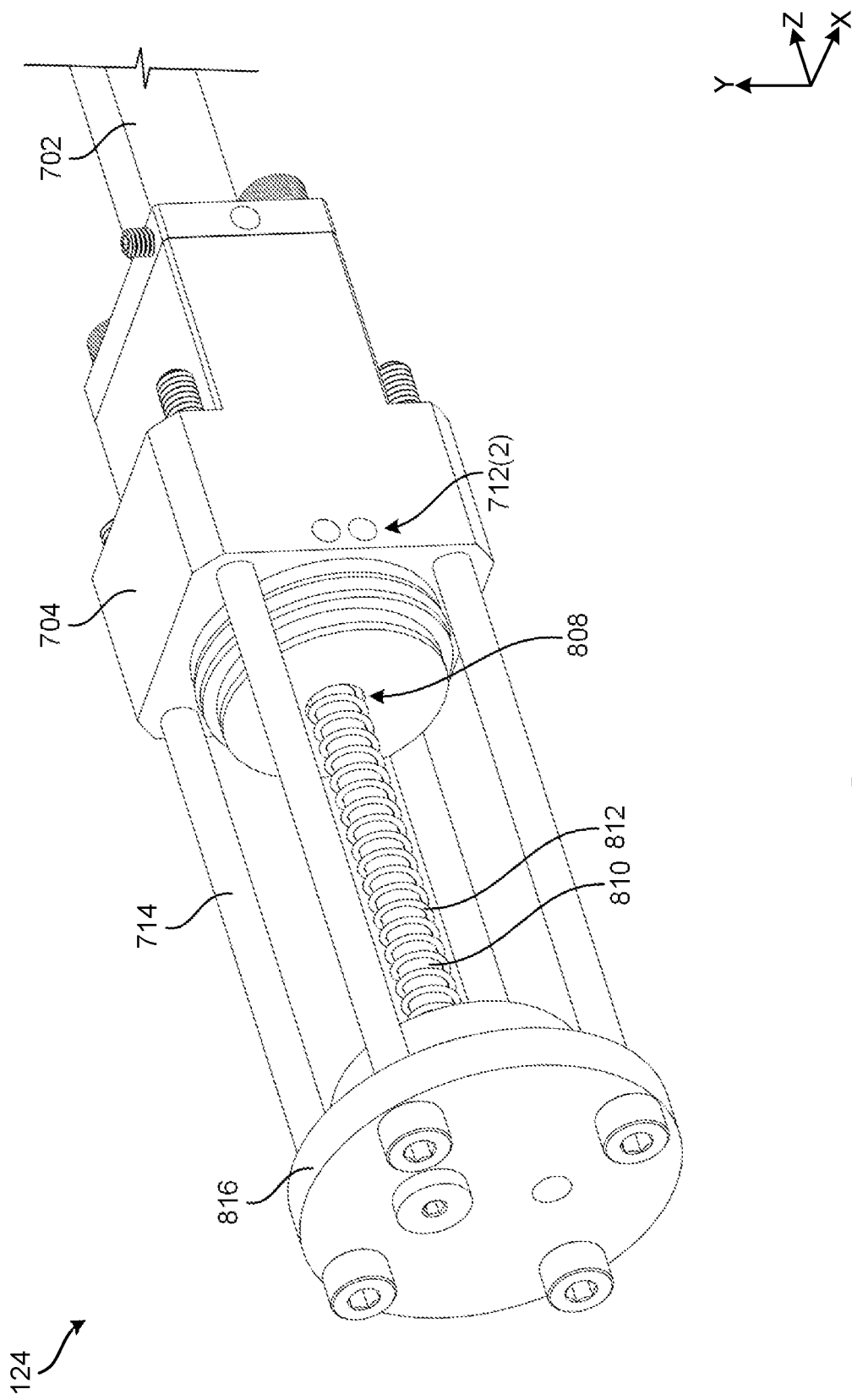
FIG. 11 illustrates a partial view of the energy limiting device of FIGS. 7A-7C, according to examples of the present disclosure.

FIG. 11 illustrates a partial view of the energy limiting device 124, according to examples of the present disclosure. For example, the housing 814 is shown being removed. The housing 814, as discussed above, is configured to seat on the sleeve 704 and the cap 816 to define the chamber 800. The rod 810, with the biasing member 812, extends from the cap 816 and into the poppet valve 702 (via the channel 808). The first end 802 of the poppet valve 702 is configured to translate in a direction towards the cap 816, thereby allowing air from within the chamber 800 to vent through the vents 712 (such as the second vents 712(2) shown in FIG. 11). In some instances, the housing 814 is secured to or between sleeve 704 and the cap 816 via the fasteners 714.

Figure 12:
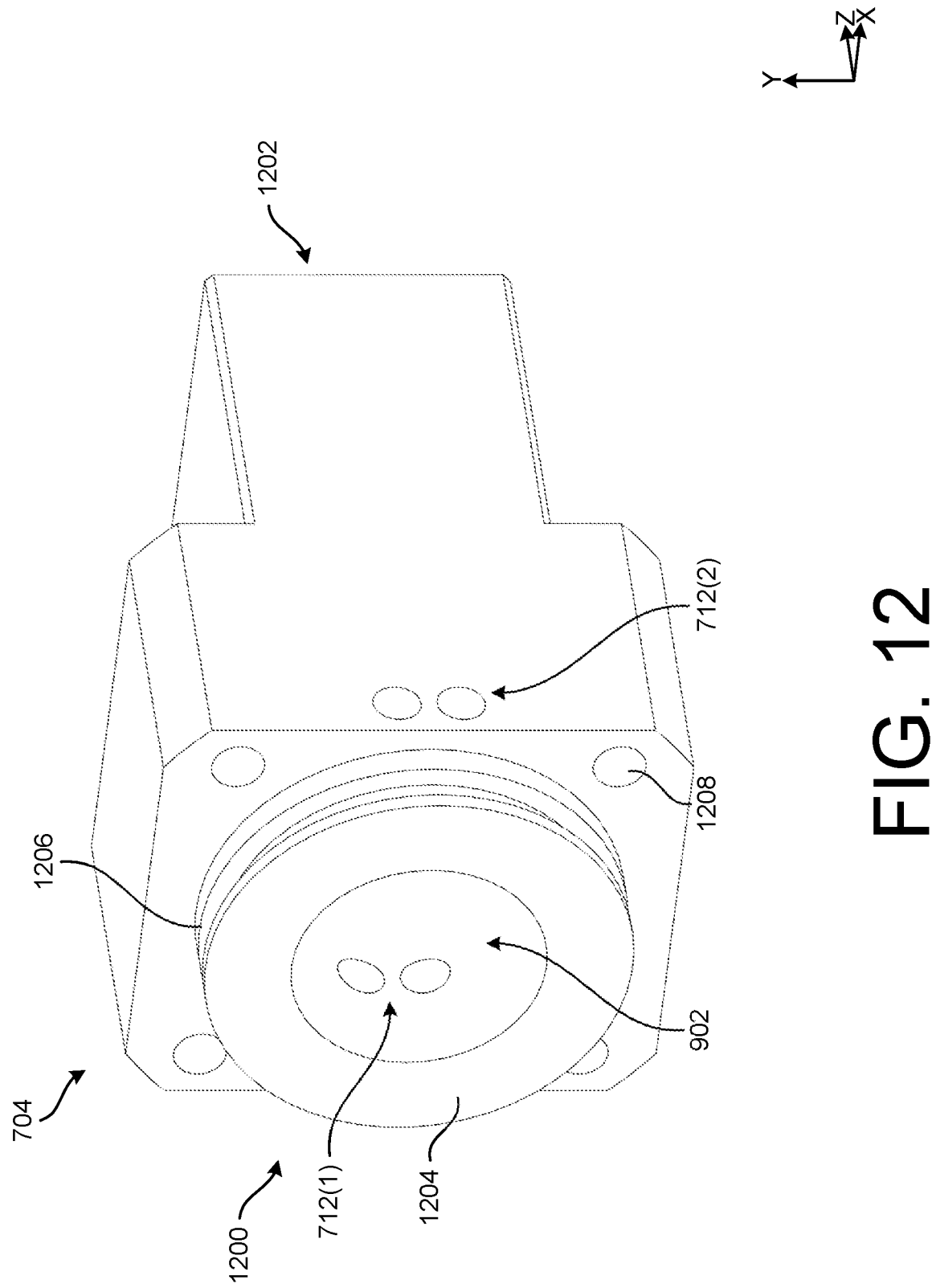
FIG. 12 illustrates an example sleeve of the energy limiting device of FIGS. 7A-7C, according to examples of the present disclosure.

FIG. 12 illustrates a perspective view of the sleeve 704, according to examples of the present disclosure. The sleeve 704 defines the passageway 902 that is configured to receive the poppet valve 702 and the bushing 806. The passageway 902 may extend longitudinally through the sleeve 704, between a proximal end 1200 and a distal end 1202 spaced apart from the proximal end 1200 (e.g., in the Z-direction). The bushing 806 may reside within the passageway 902, between the proximal end 1200 and the distal end 1202. The poppet valve 702 is configured to translate within the passageway 902, and is at least partially disposed through the passageway 902. For example, the first end 802 of the poppet valve 702 may be disposed external to the passageway 902, at the proximal end 1200, while the second end 804 of the poppet valve 702 may be disposed external to the passageway 902, at the distal end 1202. A length of the poppet valve 702 is disposed within the passageway 902, between the proximal end 1200 and the distal end 1202.

The proximal end 1200 of the sleeve 704 includes a face 1204 against which the first end 802 of the poppet valve 702 is configured to contact. The O-ring 900 may be disposed about the first end 802 of the poppet valve 702 to provide a seal against the face 1204 and prevent air leaking into passageway 902 and out the vents 712 (e.g., the first vents 712(1) and/or the second vents 712(2)). However, as discussed herein, the first end 802 of the poppet valve 702 is configured to translate away from the face 1204, so as to at least partially disengage with the face 1204, to allow the poppet valve 702 to vent air.

The proximal end 1200 of the sleeve 704 may also include a groove 1206 that receives a seal (e.g., O-ring) for sealing the housing 814 against the sleeve 704. One or more receptacles 1208 may be defined through the sleeve 704 for receiving the fasteners 714.

Figure 13:
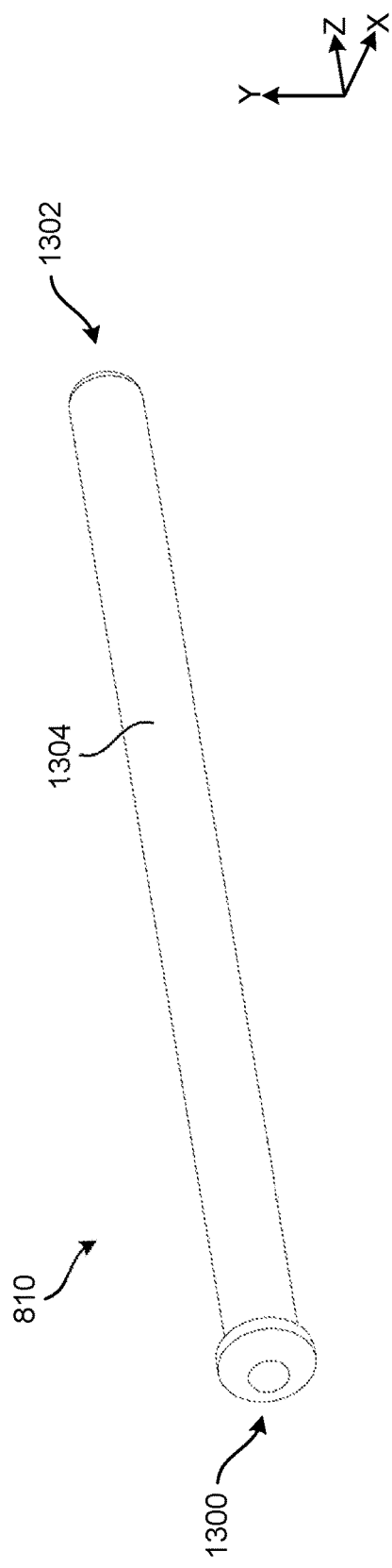
FIG. 13 illustrates an example rod of the energy limiting device of FIGS. 7A-7C, according to examples of the present disclosure.

FIG. 13 illustrates the rod 810, according to examples of the present disclosure. The rod includes a first end 1300 and a second end 1302 spaced apart from the first end 1300 (e.g., in the Z-direction). The first end 1300 may be received within the cap 816, while the second end 1302 may be received within the channel 808 of the poppet valve 702. For example, the second end 1302 may be insertable into the first end 802 of the poppet valve 702. The biasing member 812 (not shown in FIG. 13) resides around an exterior surface 1304 of the rod 810.

Figure 14:
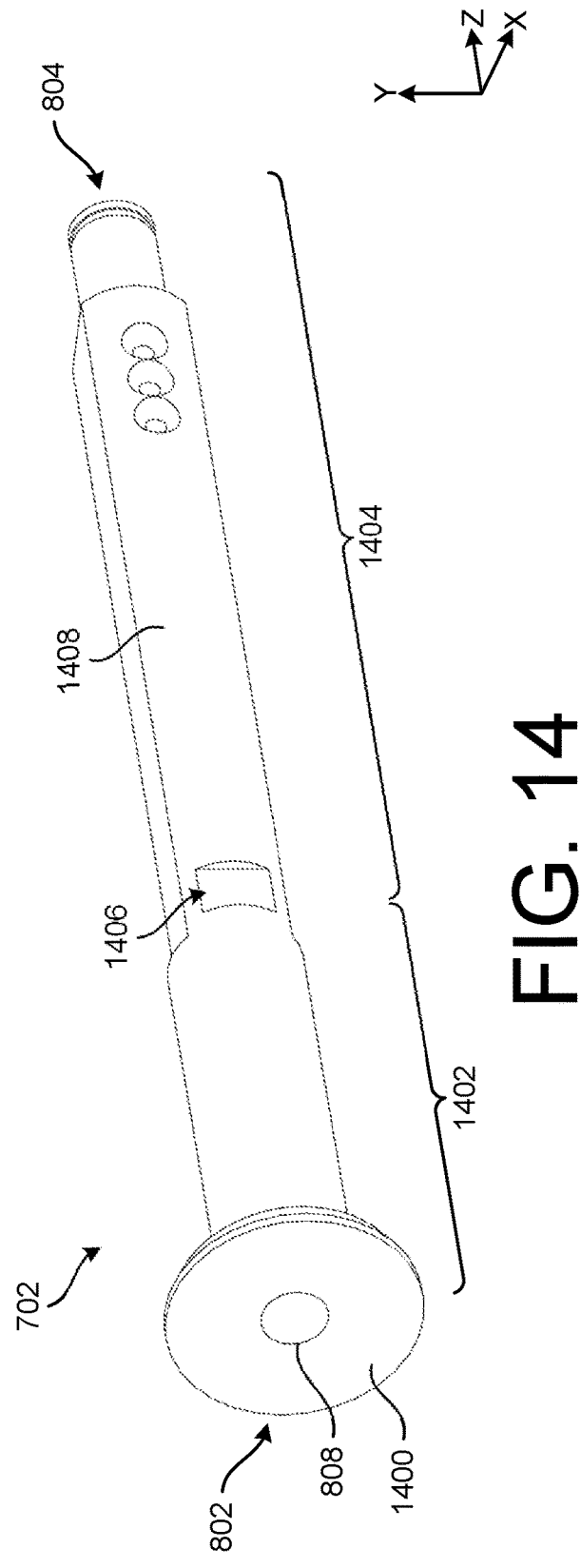
FIG. 14 illustrates an example poppet valve of the energy limiting device of FIGS. 7A-7C, according to examples of the present disclosure.

FIG. 14 illustrates the poppet valve 702, according to examples of the present disclosure. As introduced above, the poppet valve 702 includes the first end 802 and the second end 804. The first end 802 of the poppet valve 702 may include a flange 1400 (or head) that seats against the face 1204 of the sleeve 704. For example, the flange 1400 may provide a surface area that is acted upon by the air within the chamber 800 to urge the first end 802 of the poppet valve 702 against the sleeve 704. The flange 1400 may also include a groove for receiving the O-ring 900. The channel 808 also extends into the poppet valve 702 at the first end 802. The second end 804 of the poppet valve 702 is configured to couple to the engagement device 600 (or other components of the engagement mechanism 122).

A length (e.g., stem) of the poppet valve 702 extends between the first end 802 and the second end 804. In some instances, a first portion 1402 of the length includes a first diameter, while a second portion 1404 of the length includes a second diameter. In some instances, the first diameter may be greater than the second diameter, and/or the first portion 1402 of the length may be less (e.g., shorter in the Z-direction) than the second portion of the length. The first portion 1402 of the length (and/or the first diameter) may be received within the sleeve 704, while the second portion 1404 of the length (and/or the second diameter) may reside external to the sleeve 704.

The poppet valve 702 includes a notch 1406 (e.g., indentation, groove, etc.) formed on an exterior surface 1408 of the poppet valve 702. The sensor 126 may be arranged adjacent to the notch 1406 to sense translation of the poppet valve 702 relative to the conveyance mechanism 114. For example, the poppet valve 702 may be substantially cylindrically shaped, but the notch 1406 may be planar to the sensor 126 (e.g., orthogonal). The planar nature of the notch 1406 may permit the sensor 126 to more accurately and/or precisely sense movement of the poppet valve 702. As shown, and in some instances, the notch 1406 may be disposed on the second portion 1404 of the length, external to the passageway 902.

Figure 15A:
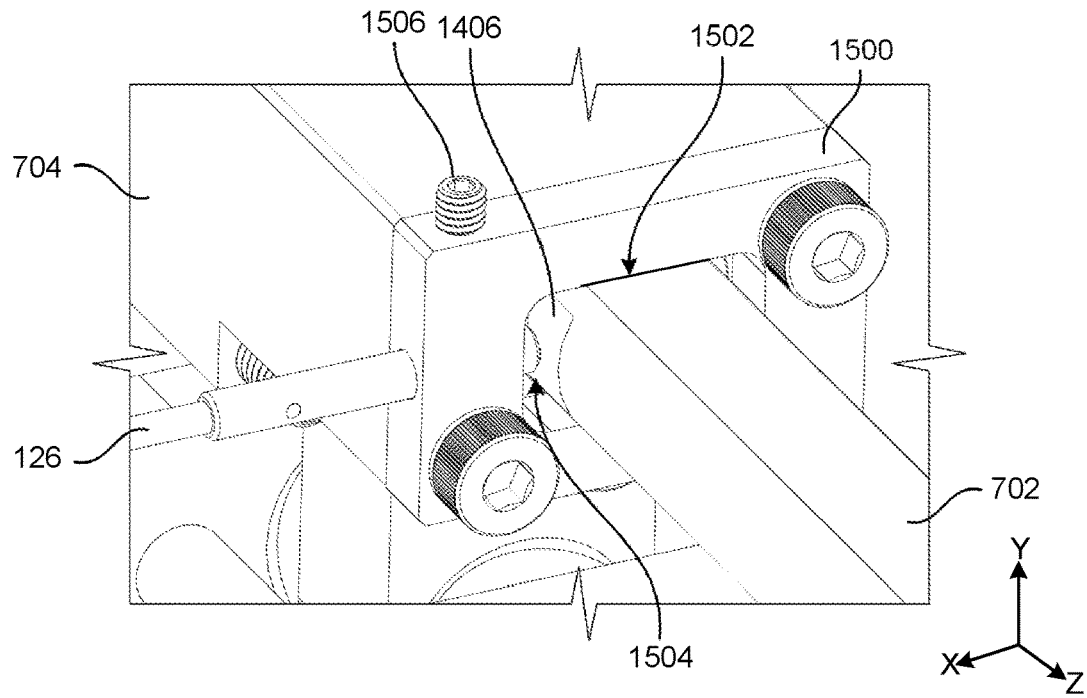
FIGS. 15A and 15B illustrate an example sensor of the energy limiting device of FIGS. 7A-7C, according to examples of the present disclosure.
Figure 15B:
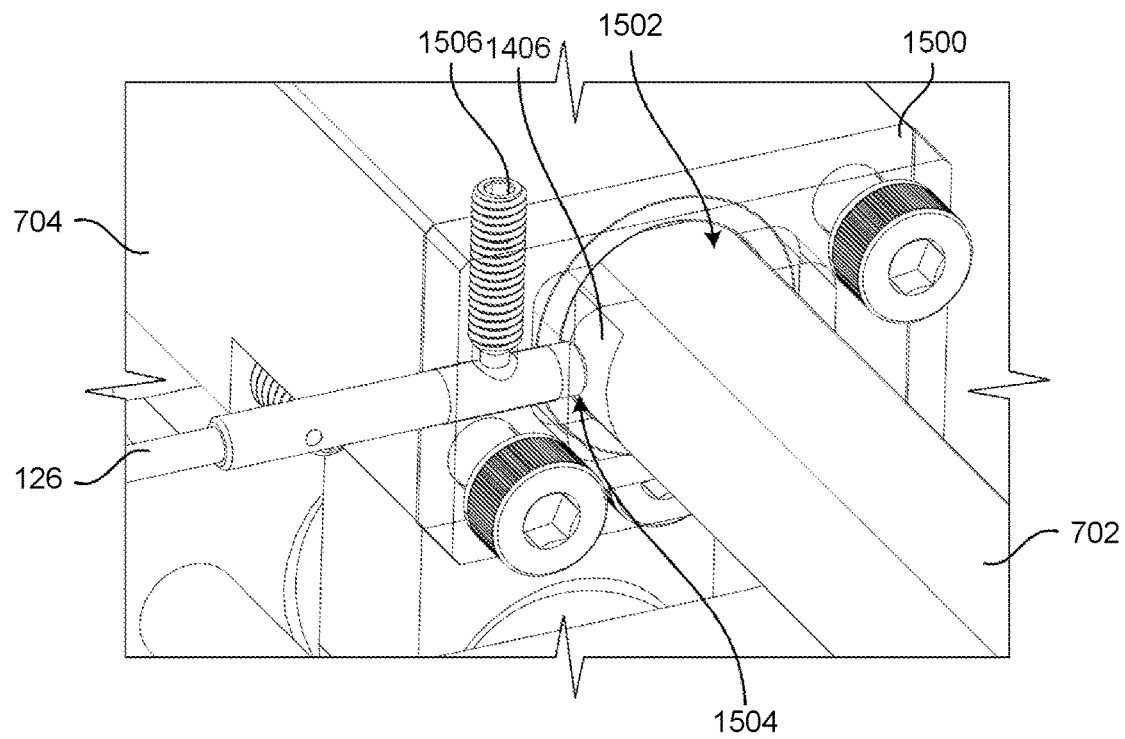
Figure 16A:
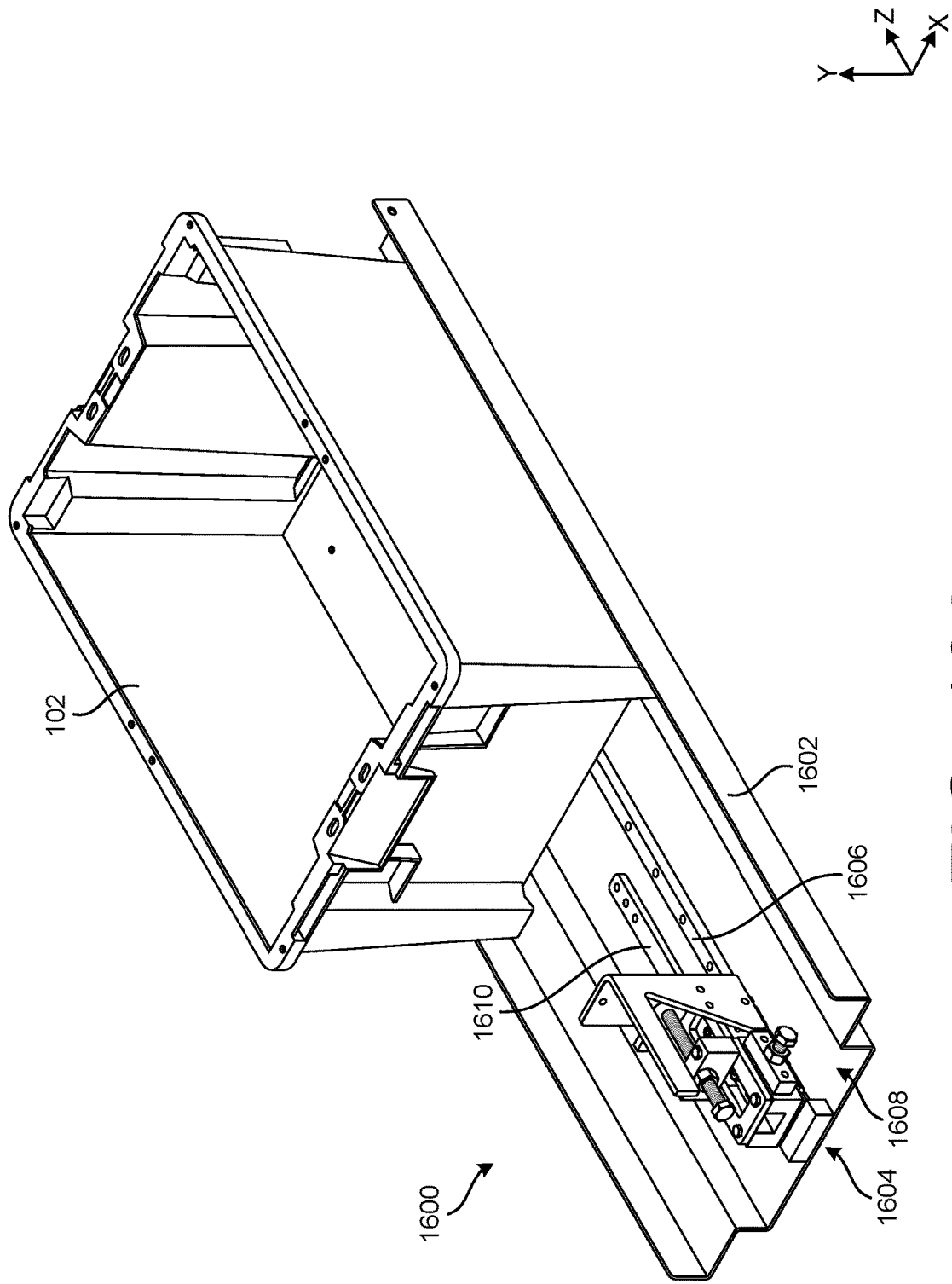
FIGS. 16A-16E illustrate an alternate example energy limiting device of the head assembly of FIG. 1, according to examples of the present disclosure.
Figure 16B:
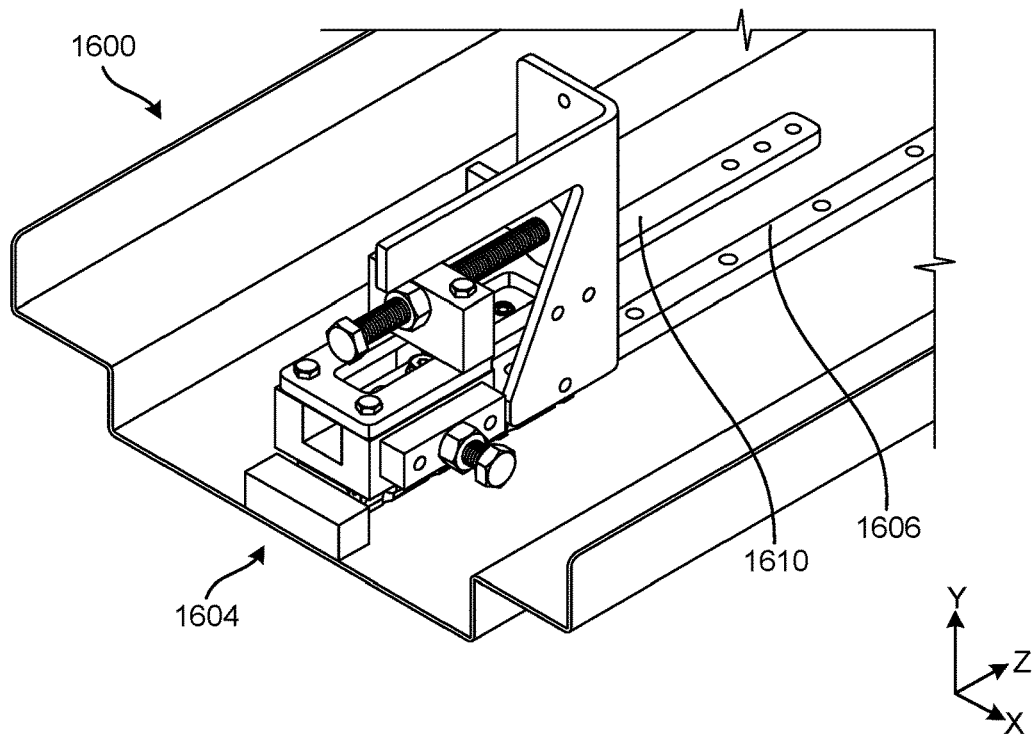
Figure 16C:
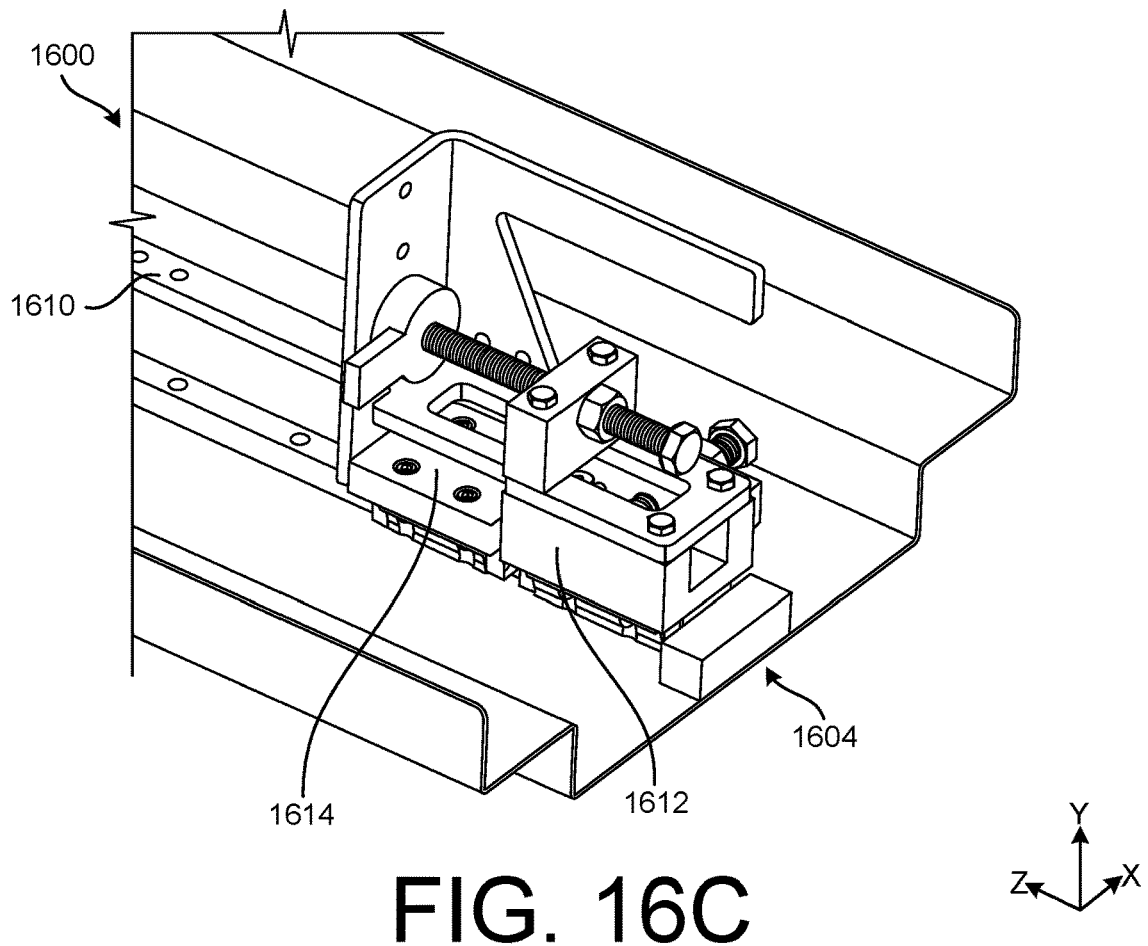
Figure 16D:
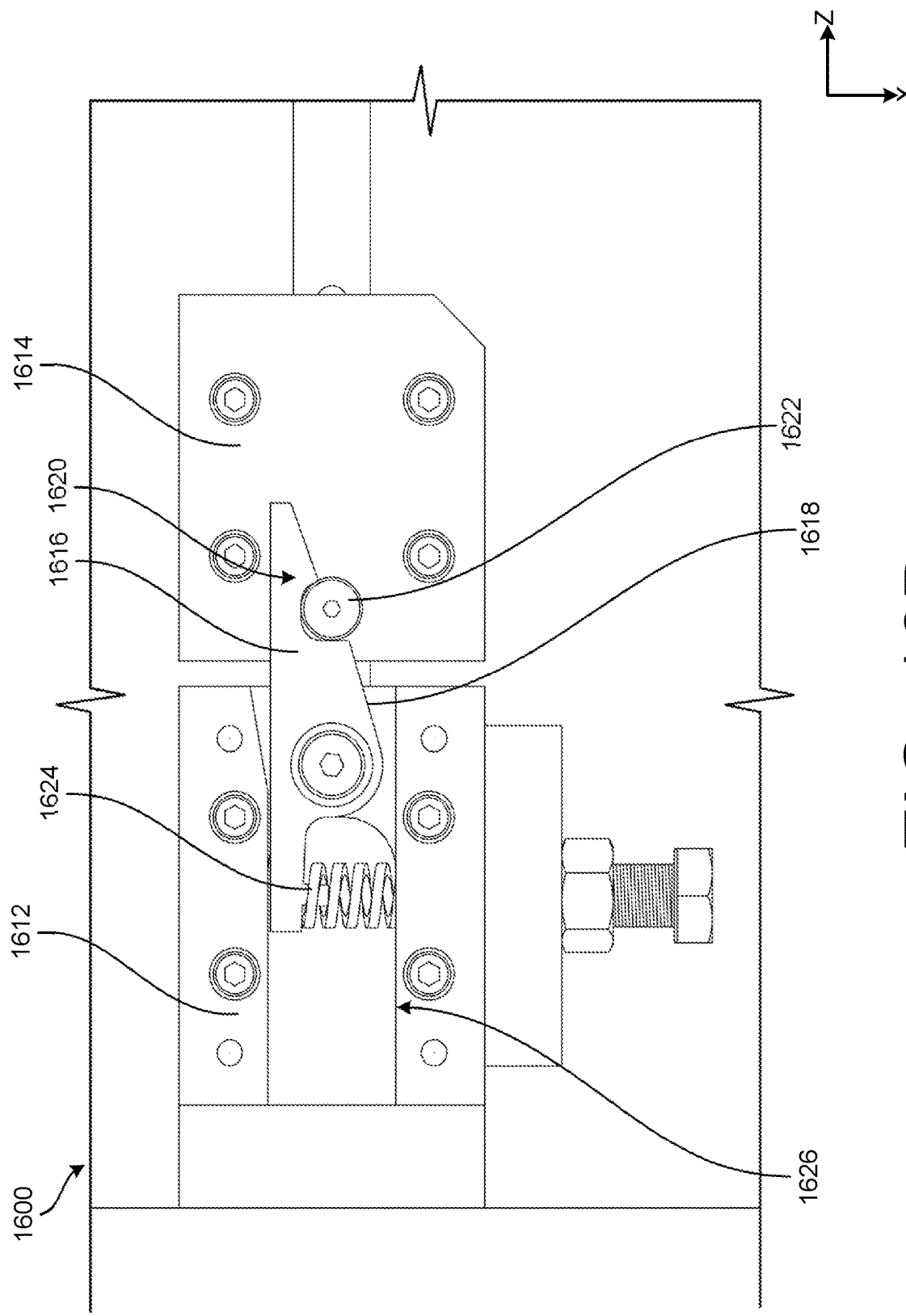
Figure 16E:
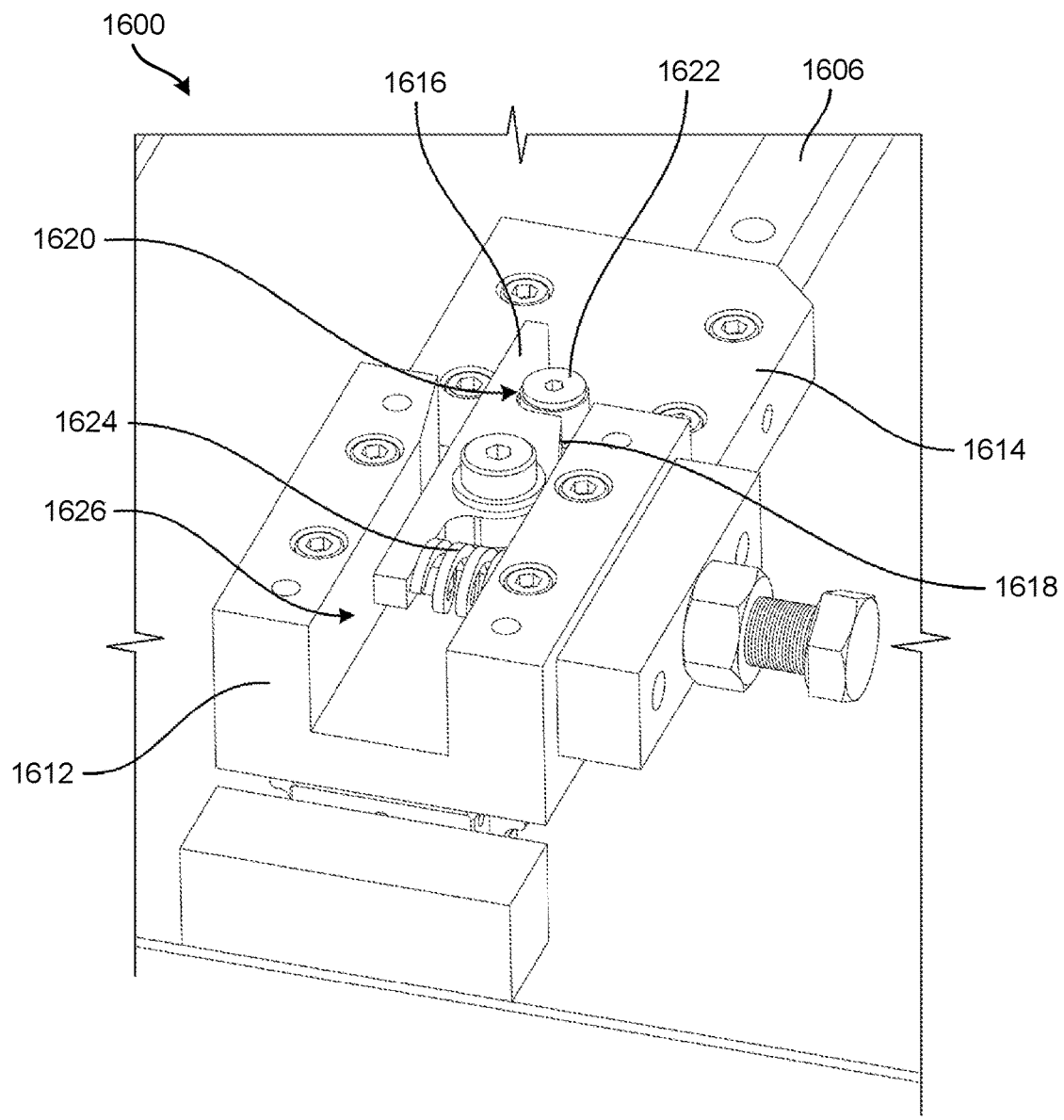
Figure 16E:
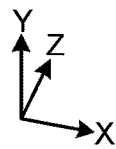

FIGS. 15A and 15B illustrate the sensor 126, according to examples of the present disclosure. In some instances, the sensor 126 is coupled to the sleeve 704 via a bracket 1500. In FIG. 15A the bracket 1500 is shown as non-transparent, whereas in FIG. 15B, the bracket 1500 is shown as being transparent.

The bracket 1500 couples to the sleeve 704, such as the distal end 1202 of the sleeve 704. The bracket 1500 further defines a passageway 1502 through which the poppet valve 702 is at least partially disposed. The sensor 126 couples to and/or is disposed at least partially through the bracket 1500. For example, the bracket 1500 may define a channel that is sized and configured to receive the sensor 126. An end 1504 of the sensor 126 may be disposed adjacent to the notch 1406 of the poppet valve 702. During translation of the poppet valve 702 (e.g., in the Z-direction), the sensor 126 is configured to sense such translation and generate the sensor data 128 for use by the control system 116. In some instances, a fastener 1506 secures the sensor 126 within the bracket 1500 (or within the channel of the bracket 1500).

FIGS. 16A-16E illustrate an alternative energy limiting device 1600, according to examples of the present disclosure. In some instances, the energy limiting device 1600 in FIGS. 16A-16E may be implemented within the head assembly 100. Additionally, the energy limiting device 1600 may be coupled to the conveyance mechanism 114 and/or the engagement mechanism 122 for transferring packages into and/or from the storage rack 106. In such instances, the conveyance mechanism 114 and/or the engagement mechanism 122 may include similar components as described above with regard to the energy limiting device 124.

In some instances, the energy limiting device 1600 couples to a mount 1602, that in turn, may couple to the base 312 of the head assembly 100. The energy limiting device 1600 may include a sled assembly 1604 disposed along a rail 1606. The rail 1606 may be similar to the rail 324 as discussed above. The sled assembly 1604 may couple to the conveyance mechanism 114 or portion thereof, such as the belts 318 and the actuator(s) 316, for pushing the container 102 into the slots 104 of the storage rack 106. For example, the belts 318 may be disposed within the mount 1602, such as within a trough 1608 of the mount 1602, and may be coupled to the sled assembly 1604. The actuator(s) 316 of the conveyance mechanism 114 are shown removed in FIGS. 16A-16E. However, actuation of the actuator(s) 316 causes the sled assembly 1604 to translate along the rail 1606 (e.g., in the Z-direction). The engagement mechanism 122, although shown removed in FIGS. 16A-16E, may couple to an arm 1610 that extends from the sled assembly 1604. Therein, the engagement mechanism 122, such as the engagement device 600, may engage with the container 102.

The sled assembly 1604 may include a first section 1612 and a second section 1614. Both the first section 1612 and the second section 1614 may be disposed along the rail 1606, and may translate during actuation of the actuator(s) 316. The first section 1612 may include a link 1616 that couples the first section 1612 to the second section 1614. For example, the link 1616 may define a cam profile 1618. The cam profile 1618 includes a pocket 1620 that receives a cam follower 1622, which is coupled to the second section 1614. In doing so, when the cam follower 1622 is disposed within the pocket 1620, the first section 1612 and the second section 1614 may be operatively coupled together (e.g., linked). The arm 1610 may extend through an opening of a strut coupled to the second section 1614.

In FIGS. 16A-16E, the cam follower 1622 is shown residing within the pocket 1620. However, in instances in which the container 102 contacts the storage rack 106, upon a sufficient amount of force being applied, the cam follower 1622 may be displaced out of the pocket 1620 and reside external to the pocket 1620. In these instances, the cam follower 1622 may translate along the cam profile 1618 to allow the engagement mechanism 122 to translate away from the storage rack 106. When the cam follower 1622 is displaced out of the pocket 1620, the second section 1614 may translate in a direction away from the first section 1612. In doing so, the arm 1610 and the engagement device 600 are allowed to translate away from the container 102. In some instances, the cam profile 1618 may include a taper. The amount of force required to displace the cam follower 1622 out of the pocket 1620 may be greater than an amount of force required to displace the cam follower 1622 along the taper. As such, one the cam follower 1622 resides external to the pocket 1620, the cam follower 1622 may translate along the tapered portion.

The link 1616 may hingedly couple (e.g., about the Y-axis) to the first section 1612 to permit the link 1616 to rotate and the cam follower 1622 to be displaced out of the pocket 1620. The link 1616, in some instances, is disposed between adjacent sidewalls 1626 of the first section 1612, and may be configured to rotate within the sidewalls 1626. The energy limiting device 1600 may also include a biasing member 1624 operably coupled to the link 1616. As shown, the biasing member 1624 may extend from one of the sidewalls 1626 and engage with the link 1616. The biasing member 1624 may urge the pocket 1620 into contact with the cam follower 1622 to couple the first section 1612 and the second section 1614. That is, the cam follower 1622 and the pocket 1620 may be pushed together under force from the biasing member 1624. In instances in which the cam follower 1622 resides external to the pocket 1620, the biasing member 1624 may urge the cam follower 1622 back into the pocket 1620.

The sensor 126 as discussed above with regards to FIGS. 15A and 15B may be implemented within the energy limiting device 1600 in order to sense translation of the arm 1610 and correspondingly halt movement of the sled assembly 1604 (e.g., via the actuator(s) 316).

Figure 17:
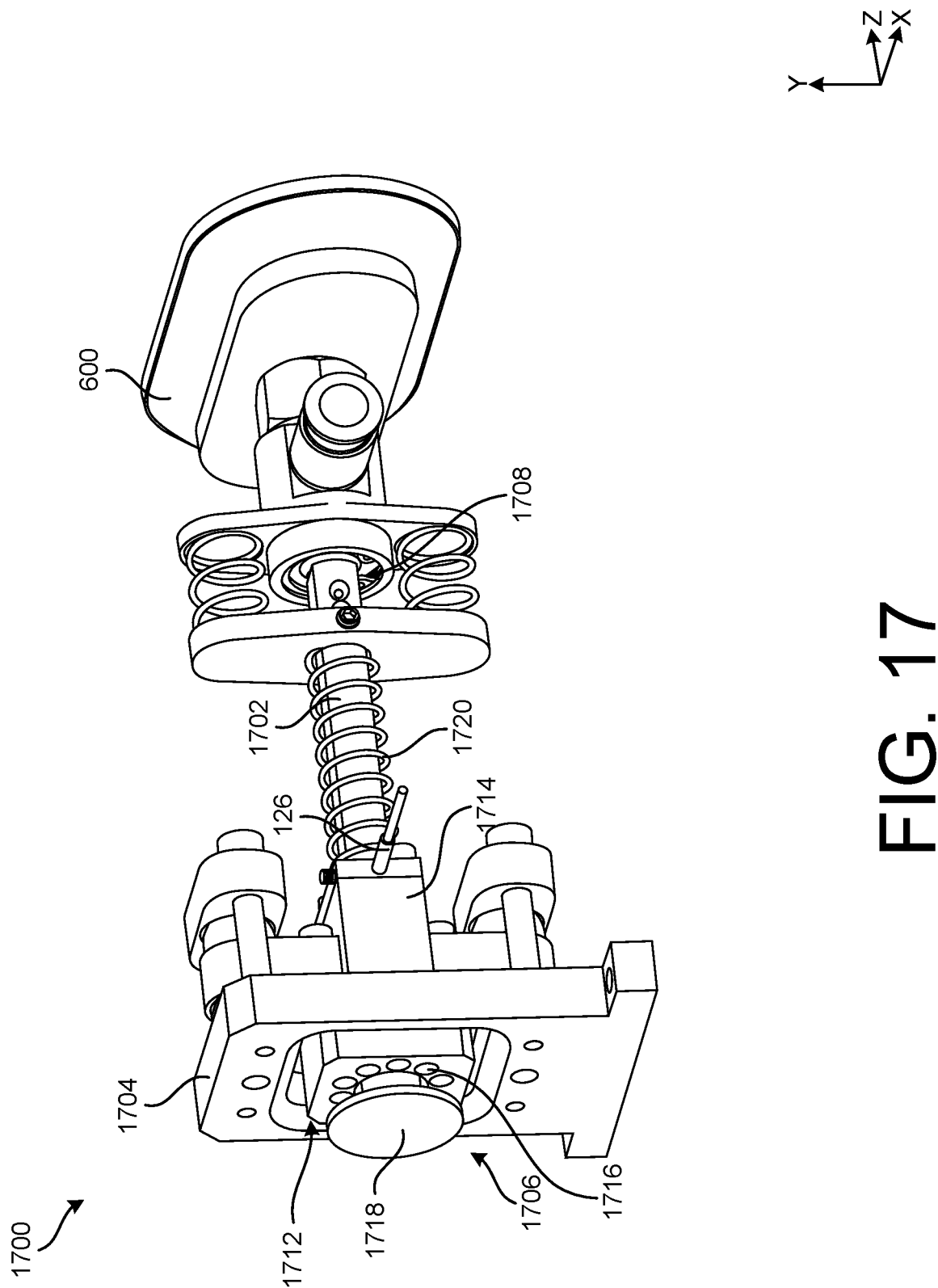
FIG. 17 illustrates an alternate example energy limiting device of the head assembly of FIG. 1, according to examples of the present disclosure.

FIG. 17 illustrates an alternative energy limiting device 1700, according to examples of the present disclosure. In some instances, the energy limiting device 1700 in FIG. 17 may be implemented within the head assembly 100. Additionally, the energy limiting device 1700 may be coupled to the conveyance mechanism 114 and/or the engagement mechanism 122 for transferring packages into and/or from the storage rack 106. In such instances, the conveyance mechanism 114 and/or engagement mechanism 122 may include similar components as described above with regard to the energy limiting device 124.

The energy limiting device 1700 is shown including an arm 1702 (e.g., shaft) disposed through a bracket 1704. In some instances, the bracket 1704 may be similar to or represent the bracket 704, and/or the arm 1702 may be similar to and/or represent the poppet valve 702. The arm 1702 may include a first end 1706 disposed adjacent to the bracket 1704, and a second end 1708 coupled to the engagement device 600. The arm 1702 may be at least partially disposed within the bracket 1704, for example, via a channel, passageway, or opening 1712 extending through the bracket 1704. Additionally, the arm 1702 may be at least partially disposed within a sleeve 1714. The opening 1712 and/or the sleeve 1714 may be similar to and/or represent the opening 716 and the sleeve 704, respectively. The arm 1702 is configured to translate within the sleeve 1714, for example, in the event that the container 102 contacts the storage rack 106. Magnetic element(s) 1716 may be coupled to and/or disposed on the sleeve 1714. The magnetic element(s) 1716 may engage (e.g., attract) with a material of the arm 1702 (e.g., steel), such as a head 1718, disposed at the first end 1706.

The bracket 1704 may be coupled to the carriage 322 of the conveyance mechanism 114, so as to translate along the rail 324 during actuation of the actuator(s) 316. During transferring of the container 102 into the storage rack 106, the arm 1702 pushes against the container 102 via the engagement device 600. During this instance, the magnetic element(s) 1716 and first end 1706 of the arm 1702 maintain an engagement. As such, the magnetic element(s) 1716 and a material of the arm 1702 include a sufficient attraction during a transfer of the container 102 into the slot in order to resist separation and such that the engagement device 600 may push on the container 102. However, when the container 102 contacts the storage rack 106, additional force is imparted to the arm 1702, and if sufficient enough, the first end 1706 (or the head 1718) becomes separated from the magnetic element(s) 1716. In these instances, the arm 1702 may translate away from the storage rack 106 and the first end 1706 may separate from the magnetic element(s) 1716. That is, when the container 102 contacts the storage rack 106, the force imparted to the arm 1702 may overcome the attraction between the magnetic element(s) 1716 and the magnetic material (e.g., steel) of the arm 1702 such that the arm 1702 is permitted to translate in a direction away from the container 102. As such, the first end 1706 of the arm 1702 may translate in a direction away from the magnetic element(s) 1716.

Additionally, the energy limiting device 1700 includes a biasing member 1720 disposed about the arm 1702, in between the sleeve 1714 and the second end 1708 of the arm 1702. The biasing member 1720 may serve the same purpose as the biasing member 812 discussed above. For example, following a translation of the arm 1702, the biasing member 1720 may bias the arm 1702. In doing so, the magnetic element(s) 1710 and the first end 1706 of the arm 1702 may come into proximity with one another.

Although the magnetic element(s) 1716 are shown as having a certain arrangement, the magnetic element(s) 1716 may be arranged differently. Additionally, the magnetic element(s) 1716 may be disposed on the first end 1706 of the arm 1702, and the magnetic element(s) 1716 may be attracted to a magnetic material of the bracket 1704. Although the magnetic element(s) 1716 are shown as having a certain shape or number, the magnetic element(s) 1716 may be shaped differently than shown and/or may include a greater number or lesser number than shown.

The sensor 126 as discussed above with regards to FIGS. 15A and 15B may be implemented within the energy limiting device 1700 in order to sense translation of the arm 1702 and correspondingly halt movement of the carriage 322.

Figure 18:
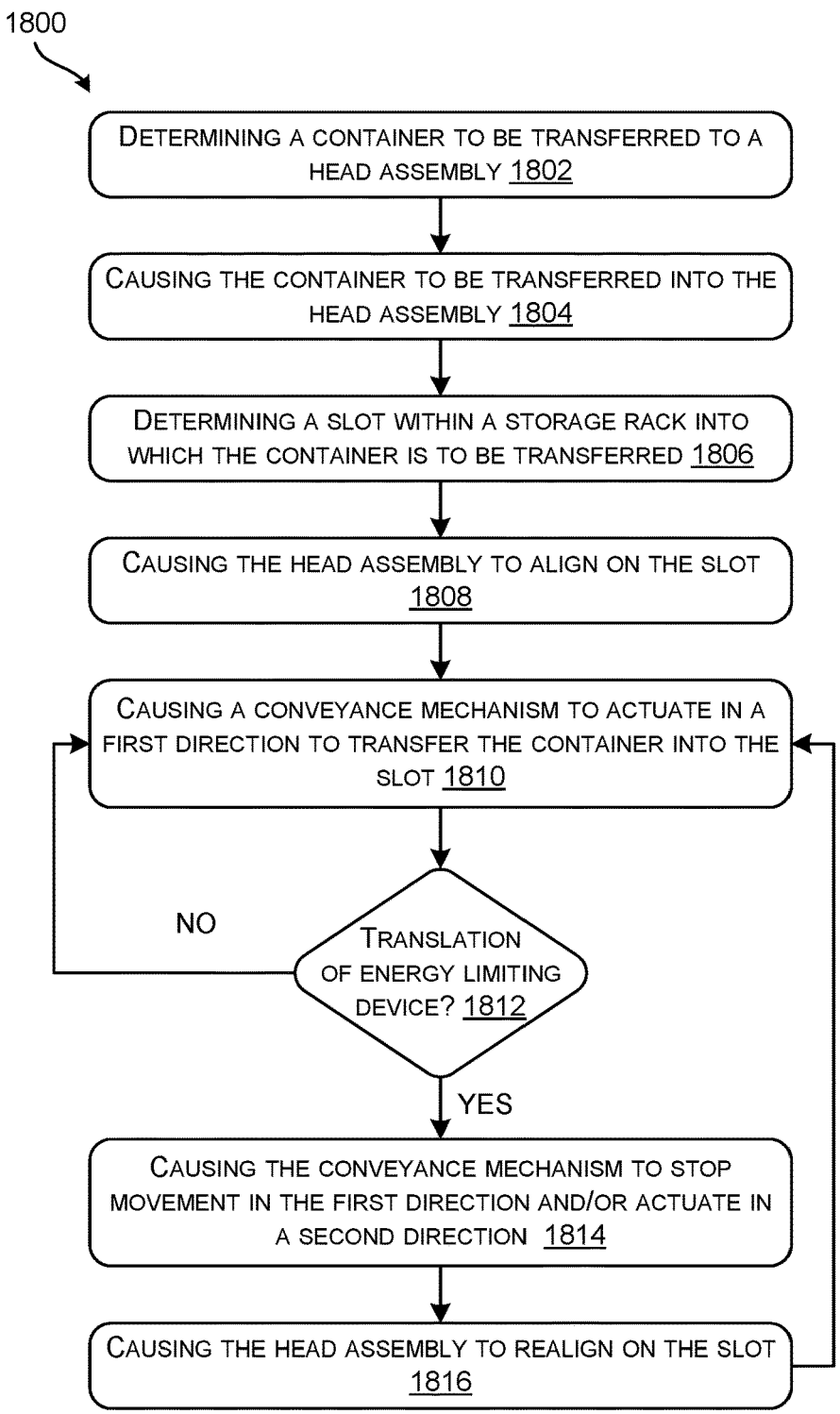
FIG. 18 illustrates an example process for transferring a container into a storage rack, according to examples of the present disclosure.

FIG. 18 illustrates a process 1800 for transferring a container 102 into the storage rack 106. The process 1800 described herein is illustrated as collections of blocks in logical flow diagrams, which represent a sequence of operations, some or all of which may be implemented in hardware, software, or a combination thereof. In the context of software, the blocks may represent computer-executable instructions stored on one or more computer-readable media that, when executed by one or more processors, program the processors to perform the recited operations. Generally, computer-executable instructions include routines, programs, objects, components, data structures and the like that perform particular functions or implement particular data types. The order in which the blocks are described should not be construed as a limitation, unless specifically noted. Any number of the described blocks may be combined in any order and/or in parallel to implement the process, or alternative processes, and not all of the blocks need be executed. For discussion purposes, the process 1800 is described with reference to the environments, architectures, devices, and systems described in the examples herein, such as, for example those described with respect to FIGS. 1-17, although the process 1800 may be implemented in a wide variety of other environments, architectures, devices, and systems.

At 1802, the process 1800 may include determining a container to be transferred (e.g., loaded) to a head assembly. For example, the control system 116 may determine a container 102 that is to be transferred to the head assembly 100. In some instances, the container 102 may arrive at the head assembly 100 via a conveyor, crate, or rack, and the like.

At 1804, the process 1800 may include causing the container to be transferred into the head assembly. For example, the control system 116 may actuate the positioning system 108 and/or the head assembly 100 to position adjacent to the container 102. Once in position, the conveyance mechanism 114 may actuate towards the container 102 and therein, the engagement mechanism 122 may be actuated. Actuation of the engagement mechanism 122 may engage the container 102, and therein, the conveyance mechanism 114 may be actuated to load the container 102 into the head assembly 100. During this instance, the container 102 may be pulled into the head assembly 100 as the carriage 322, for example, of the conveyance mechanism 114 translates along the rail 324.

At 1806, the process 1800 may include determining a slot within a storage rack into which the container is to be transferred. For example, the storage rack 106 may include a plurality of slots 104, and the control system 116 may determine a corresponding slot 104 of the storage rack 106 into which this container 102 is to be loaded. In some instances, the control system 116 may receive data associated with the container 102, such as a barcode or other identifier, for identifying the container 102 and/or the slot 104 into which the container 102 is to be placed.

At 1808, the process 1800 may include causing the head assembly to align on the slot. For example, in some instances, the control system 116 may control the positioning system 108 and/or the head assembly 100 for moving the head assembly 100 into position adjacent to the slot 104. In some instances, the positioning system 108 and/or the head assembly 100 may move the container 102 vertically, horizontally, and/or rotationally.

At 1810, the process 1800 may include causing a conveyance mechanism to actuate in a first direction to transfer the container into the slot. For example, the control system 116 may cause the actuator(s) 316 of the conveyance mechanism 114 to actuate in a first direction to push the container 102 into the slot. During this instance, the carriage 322 may translate along the rail 324, for example, and the engagement device 600 may engage with the container 102.

At 1812, the process 1800 may include determining whether a translation of an energy limiting device is detected. For example, as discussed herein, an energy limiting device, such as the energy limiting device 124, is configured to translate (e.g., collapse) under a certain amount of force. Such force, for example, may be imparted in instances where the container 102 contacts the storage rack 106. In the event that the energy limiting device 124 translates the engagement mechanism 122 away from the storage rack 106, such translation may be sensed via the sensor 126. For example, the control system 116 may receive the sensor data 128 from the sensor 126. In the event that the control system 116 receives the sensor data 128, and the sensor data 128 is not indicative of the energy limiting device 124 translating, the process 1800 may follow the "NO" route and loop to 1810. As such, the conveyance mechanism 114 may continue to actuate in the first direction.

Alternatively, if at 1812 the process 1800 determines that the energy limiting device 124 has been translated, the process 1800 may follow the "YES" route and proceed to 1814. At 1814, the process 1800 may include causing the conveyance mechanism to stop movement and/or actuate in a second direction. For example, the control system 116 may cause the actuators to stop moving the container 102 in the first direction, and may cause the actuator(s) 316 to reverse movement (e.g., in the second direction). Such control may limit the container 102 being pushed further into the storage rack 106. However, as discussed herein, the energy limiting device 124 may translate (e.g., collapse) to disengage the engagement mechanism 122 with the container 102 to prevent the conveyance mechanism 114 pushing the container further into the storage rack 106 (e.g., during a response time of the control system 116 and/or actuator(s) 316, and/or while the actuator(s) 316 deaccelerate).

At 1816, the process 1800 may include causing the head assembly to realign on the slot. For example, the control system 116 may control the positioning system 108 and/or the head assembly 100 to realigning the head assembly 100 on the slot 104. Such realignment may avoid the container 102 contacting the storage rack 106 in future instances. From 1816, the process 1800 may continue to 1810 whereby the control system 116 may cause the conveyance mechanism 114 to actuate in the first direction to transfer the container 102 into the slot 104.

Although the discussion herein relates to the container 102 contacting the storage rack 106, and the energy limiting device 124 displacing in the event of such contact, the energy limiting device 124 may be configured to translate upon contact with other objects in the environment (e.g., other containers, shelving, etc.). As such, in the event that the container 102 contacts an object, and that object causes a translation of the energy limiting device 124, the control system 116 is configured to control the conveyance mechanism 114.

While the foregoing invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative some embodiments that fall within the scope of the claims of the application

What is claimed is:
1. A system, comprising:
a positioning mechanism;
a head assembly coupled to the positioning mechanism, the head assembly being configured to transfer a container into a slot of a storage rack, the head assembly including:
a conveyance mechanism that receives the container, the conveyance mechanism being configured to actuate in a first direction towards the storage rack,
an engagement mechanism configured to engage with an end of the container,
an energy limiting device coupled to the conveyance mechanism and the engagement mechanism, the energy limiting device being configured to permit the engagement mechanism to translate in a second direction, opposite the first direction, upon the container contacting the storage rack, wherein the energy limiting device is configured to permit the engagement mechanism to translate in the second direction as the conveyance mechanism moves in the first direction following the container contacting the storage rack, wherein the energy limiting device comprises a cam follower, and a cam profile having a first portion and a second portion, the first portion including a pocket; and
a sensor configured to sense translation of the energy limiting device in the second direction;
one or more processors; and
one or more non-transitory computer-readable media storing computer-executable instructions that, when executed by the one or more processors, cause the one or more processors to perform operations comprising:
receiving data from the sensor indicative of the translation of the energy limiting device in the second direction, and
causing the conveyance mechanism to stop movement in the first direction.

2. The system of claim 1, wherein:
the energy limiting device includes an air cylinder and a poppet valve;
upon the container contacting the storage rack, the poppet valve translates in the second direction to vent air within the air cylinder; and
the engagement mechanism is configured to translate with the poppet vale in the second direction.

3. The system of claim 1, wherein:
the energy limiting device includes:
a shaft coupled to the engagement mechanism, and
a bracket having one or more magnetic elements attracted to at least a portion of the shaft; and
upon the container contacting the storage rack, the shaft translates in the second direction to disengage the one or more magnetic elements from the portion of the shaft.

4. The system of claim 1, wherein
upon the container contacting the storage rack, the cam follower is displaced from the pocket and resides along the second portion.

5. An assembly, comprising:
a conveyance mechanism configured to move in a first direction and a second direction opposite the first direction;
an energy limiting device coupled to the conveyance mechanism, the energy limiting device being configured to:
move in the first direction with the conveyance mechanism, and
move in the second direction, as the conveyance mechanism moves in the first direction, upon experiencing an amount of force that is greater than a threshold amount of force;
wherein the energy limiting device comprises a cam follower, and a cam profile defining a pocket, and a sensor configured to generate sensor data associated with movement of the energy limiting device in the second direction as the conveyance mechanism moves in the first direction.

6. The assembly of claim 5, wherein the energy limiting device is configured to move with the conveyance mechanism in the first direction upon experiencing a second amount of force that is less than the threshold amount of force.

7. The assembly of claim 5, wherein the sensor data is configured to cause the conveyance mechanism to at least one of:
stop movement in the first direction; or
begin movement in the second direction.

8. The assembly of claim 5, further comprising an engagement mechanism coupled to the energy limiting device and the conveyance mechanism, wherein the energy limiting device is configured to permit the engagement mechanism to move in the second direction upon the energy limiting device experiencing the threshold amount of force.

9. The assembly of claim 8, wherein:
the conveyance mechanism is configured to move in the first direction to transfer a container into a slot;
the engagement mechanism is configured to engage with an end of the container as the conveyance mechanism moves in the first direction; and
the engagement mechanism is configured to disengage with the end of the container as the energy limiting device moves in the second direction.

10. The assembly of claim 8, wherein the energy limiting device includes a biasing member configured to bias the engagement mechanism in the first direction following movement of the engagement mechanism in the second direction with the energy limiting device.

11. The assembly of claim 5, wherein:
the energy limiting device includes:
an air cylinder defining a chamber,
a sleeve at least partially enclosing the chamber, the sleeve having one or more vents, and
a poppet valve having a first end and a second end, the first end being disposed within the chamber and the second end being disposed external to the sleeve;
during movement of the energy limiting device in the first direction with the conveyance mechanism, the first end is sealed against the sleeve to permit pressurized air within the chamber; and
during movement of the energy limiting device in the second direction as the conveyance mechanism moves in the first direction, the first end is spaced apart from the sleeve to vent the pressurized air through the vents.

12. The assembly of claim 5, wherein:
the energy limiting device includes:
a shaft,
a bracket, and
at least one magnetic element disposed on the bracket;
during movement of the energy limiting device in the first direction with the conveyance mechanism, the magnetic element is magnetically engaged with the shaft; and
during movement of the energy limiting device in the second direction as the conveyance mechanism moves in the first direction, the magnetic element is magnetically disengaged with the shaft.

13. The assembly of claim 5, wherein
during movement of the energy limiting device in the first direction with the conveyance mechanism, the cam follower resides within the pocket; and
during movement of the energy limiting device in the second direction as the conveyance mechanism moves in the first direction, the cam follower resides external to the pocket.

14. The assembly of claim 5, wherein the conveyance mechanism includes:
a rail; and
a carriage being configured to translate along the rail during movement of the conveyance mechanism in the first direction and the second direction, the energy limiting device being coupled to the carriage.

15. A method, comprising:
causing an engagement mechanism to engage with a container;
causing a conveyance mechanism to move such that the engagement mechanism pushes the container in a first direction;
receiving, at a first instance in time, sensor data associated with an energy limiting device coupled to the engagement mechanism and the conveyance mechanism moving in a second direction, wherein movement of the energy limiting device in the second direction occurs as the conveyance mechanism moves in the first direction, wherein the energy limiting device comprises a cam follower, and a cam profile defining a pocket; and
causing, at a second instance in time that is after the first instance in time, the conveyance mechanism to at least one of stop movement in the first direction or begin movement in the second direction.

16. The method of claim 15, wherein the energy limiting device includes at least one of:
an air cylinder;
magnetic elements; or
a cam mechanism.

17. The method of claim 16, wherein based on the energy limiting device and the engagement mechanism moving in the second direction:
the air cylinder is configured to vent air;
the magnetic elements are configured to disengage; or
a cam follower of the cam mechanism is disposed external to a pocket of the cam mechanism.

18. The method of claim 15, wherein the energy limiting device includes a biasing member that is configured to move the engagement mechanism in the first direction at a third instance in time that is after the second instance in time.

19. The method of claim 15, wherein:
the energy limiting device is configured to move in the first direction as the conveyance mechanism moves in the first direction upon the container imparting a first amount of force to the energy limiting device that is less than a threshold amount of force; and
the energy limiting device is configured to move in the second direction as the conveyance mechanism moves in the first direction upon the container imparting a second amount of force to the energy limiting device that is greater than or equal to the threshold amount of force.

20. The method of claim 15, further comprising:
causing the engagement mechanism to engage with the container; and
causing, at a third instance in time that is after the second instance in time, the conveyance mechanism to move such that the engagement mechanism pushes the container in the first direction.

* * * * *